(12) United States Patent
Yoshimura et al.

(10) Patent No.: US 12,419,206 B2
(45) Date of Patent: Sep. 23, 2025

(54) WORKING MACHINE

(71) Applicant: KUBOTA CORPORATION, Osaka (JP)

(72) Inventors: Fumiya Yoshimura, Sakai (JP); Keisuke Takeda, Sakai (JP); Junki Kuroishi, Sakai (JP); Yusuke Takahashi, Sakai (JP); Yuji Okuyama, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 715 days.

(21) Appl. No.: 17/830,476

(22) Filed: Jun. 2, 2022

(65) Prior Publication Data
US 2022/0287219 A1   Sep. 15, 2022

Related U.S. Application Data

(63) Continuation of application No. PCT/JP2020/046348, filed on Dec. 11, 2020.

(30) Foreign Application Priority Data

Dec. 18, 2019   (JP) .................................. 2019-228669

(51) Int. Cl.
*A01B 69/04* (2006.01)
*B60K 17/348* (2006.01)
(Continued)

(52) U.S. Cl.
CPC .......... *A01B 69/008* (2013.01); *B60K 17/348* (2013.01); *B60W 30/143* (2013.01);
(Continued)

(58) Field of Classification Search
CPC .... A01B 69/008; B60K 17/348; B60K 17/02; B60K 17/08; B60K 17/28; B60K 25/00;
(Continued)

(56) References Cited

U.S. PATENT DOCUMENTS

| 2018/0160619 | A1* | 6/2018 | Manji .................. A01D 34/008 |
| 2018/0338407 | A1 | 11/2018 | Matsuzaki et al. |
| 2021/0053618 | A1* | 2/2021 | Brenninger ............ B60T 13/66 |

FOREIGN PATENT DOCUMENTS

| JP | 56-77214 U | 6/1981 |
| JP | 08-9709 A | 1/1996 |

(Continued)

OTHER PUBLICATIONS

Official Communication issued in International Patent Application No. PCT/JP2020/046348, mailed on Feb. 22, 2021.

*Primary Examiner* — Lindsay M Low
*Assistant Examiner* — Ruben Picon-Feliciano
(74) *Attorney, Agent, or Firm* — Keating & Bennett, LLP

(57) ABSTRACT

A working machine includes a machine body, a steering device capable of changing an orientation of the machine body, a first wheel on the machine body, a second wheel on the machine body and separated from the first wheel in a machine-body width direction, a rotational difference generator to cause a rotational difference between the first and second wheels and that is a braking device, and a controller configured or programmed to include a first control unit to set a steering angle of the steering device based on a planned traveling route, and a second control unit to control the rotational difference generator based on the planned traveling route to cause a rotational difference between the first and second wheels. Based on the planned traveling route, the second control unit is configured or programmed to cause the braking device to perform setting about braking of either the first or second wheels by performing pumping control.

12 Claims, 17 Drawing Sheets

(51) Int. Cl.
  *B60W 30/14*    (2006.01)
  *B62D 6/00*     (2006.01)
  *B62D 11/00*    (2006.01)
  *B62D 11/08*    (2006.01)
  *B62D 11/20*    (2006.01)
  *B62D 49/06*    (2006.01)
  *G05D 1/00*     (2024.01)

(52) U.S. Cl.
  CPC ............ *B62D 6/001* (2013.01); *B62D 11/003* (2013.01); *B62D 11/08* (2013.01); *B62D 11/20* (2013.01); *G05D 1/0214* (2013.01); *G05D 1/0219* (2013.01); *B62D 49/06* (2013.01)

(58) Field of Classification Search
  CPC ..... B60K 25/02; B60K 25/06; B60W 30/143; B60W 2540/18; B60W 2720/28; B60W 2720/406; B60W 30/18145; B62D 6/001; B62D 11/003; B62D 11/08; B62D 11/20; B62D 49/06; B62D 11/24; G05D 1/0214; G05D 1/0219; B60Y 2200/22
  See application file for complete search history.

(56)  References Cited

FOREIGN PATENT DOCUMENTS

| | | |
|---|---|---|
| JP | 08-11740 A    | 1/1996 |
| JP | 08-133038 A   | 5/1996 |
| JP | 11-222150 A   | 8/1999 |
| JP | 2004-123014 A | 4/2004 |
| JP | 2017-100508 A | 6/2017 |
| JP | 2018-198552 A | 12/2018 |
| JP | 2019-004731 A | 1/2019 |
| JP | 2020-104617 A | 7/2020 |

\* cited by examiner

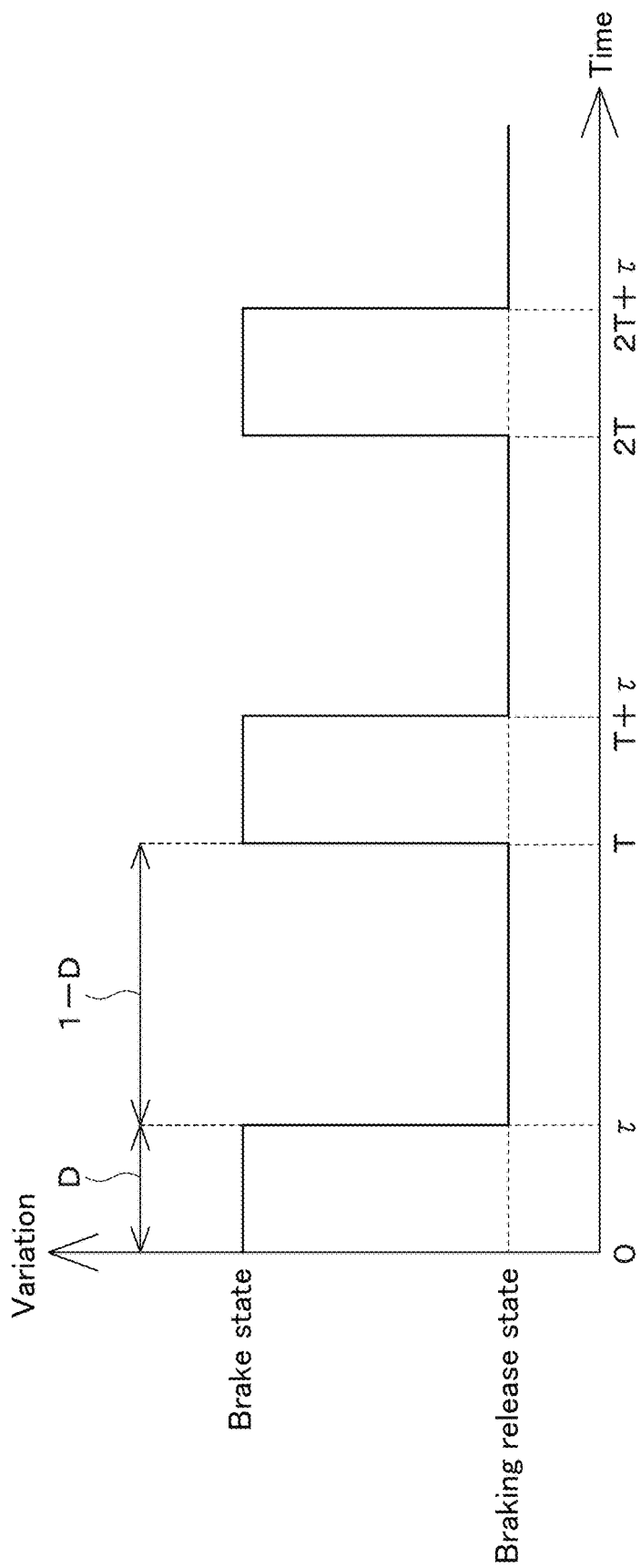

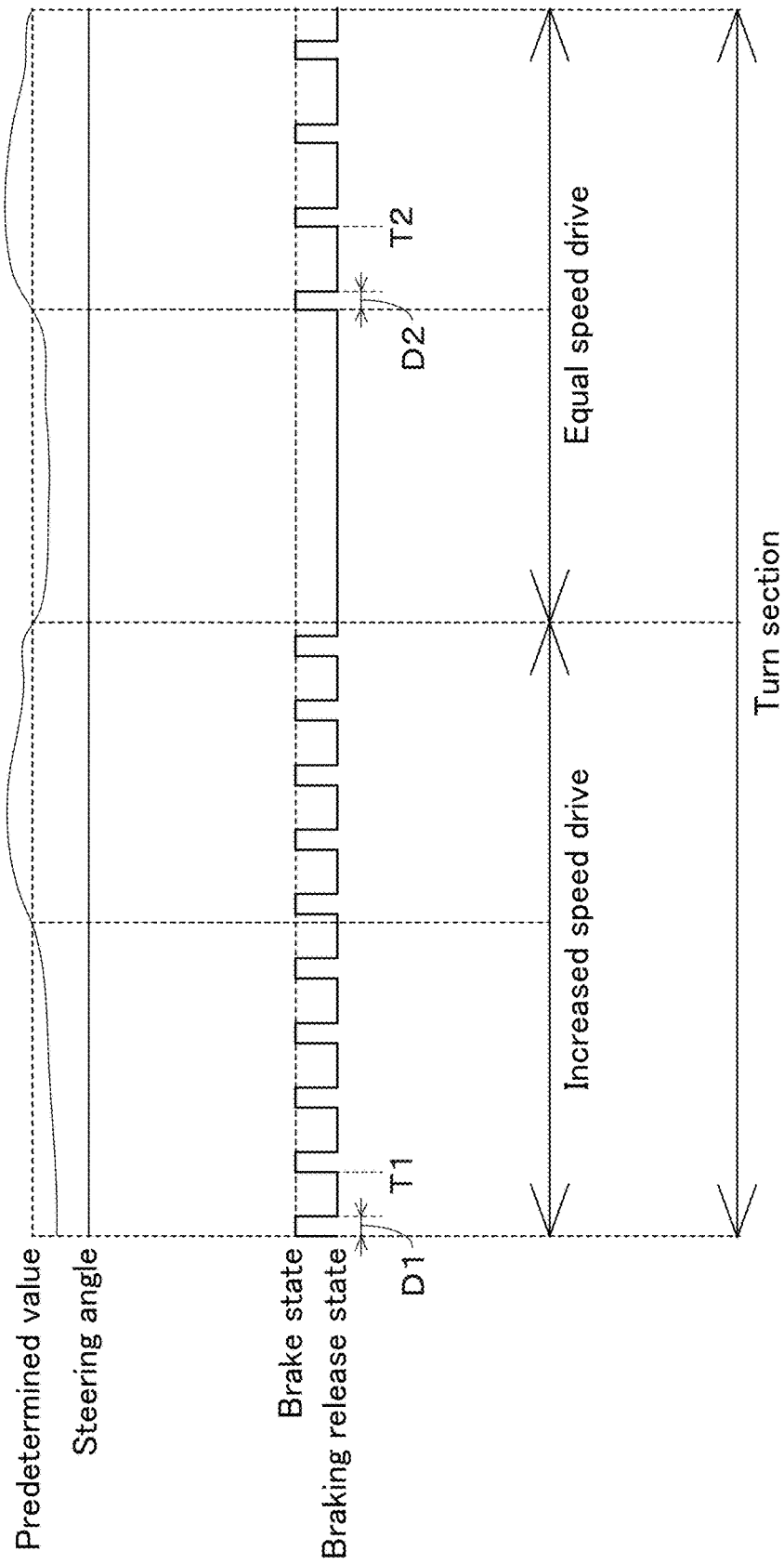

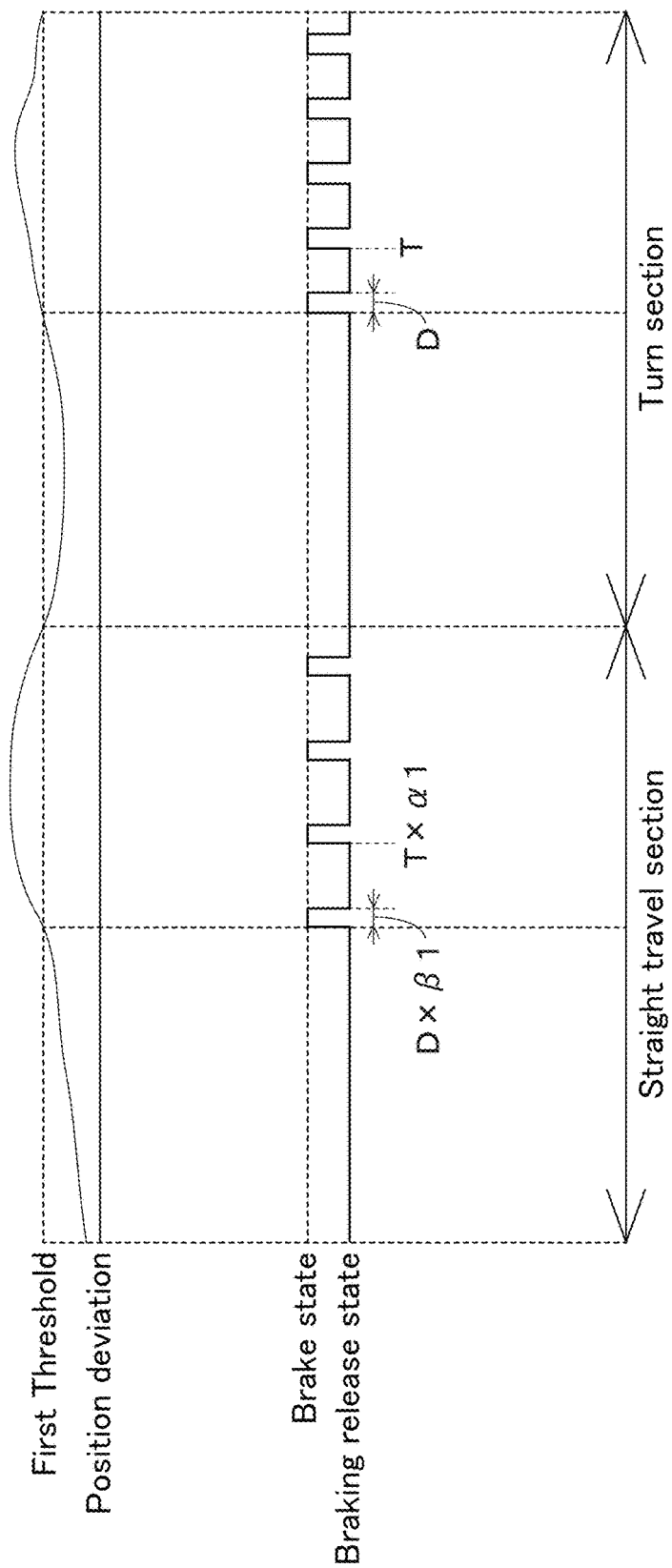

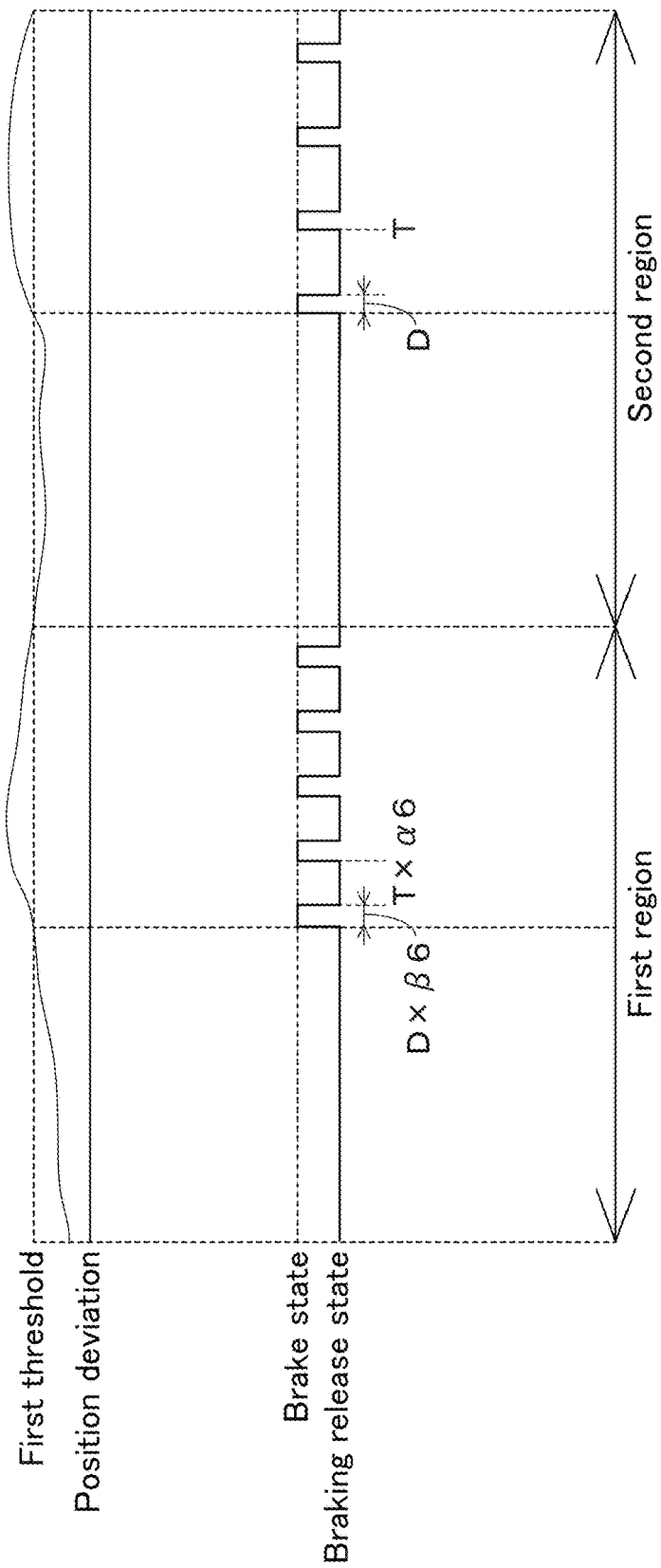

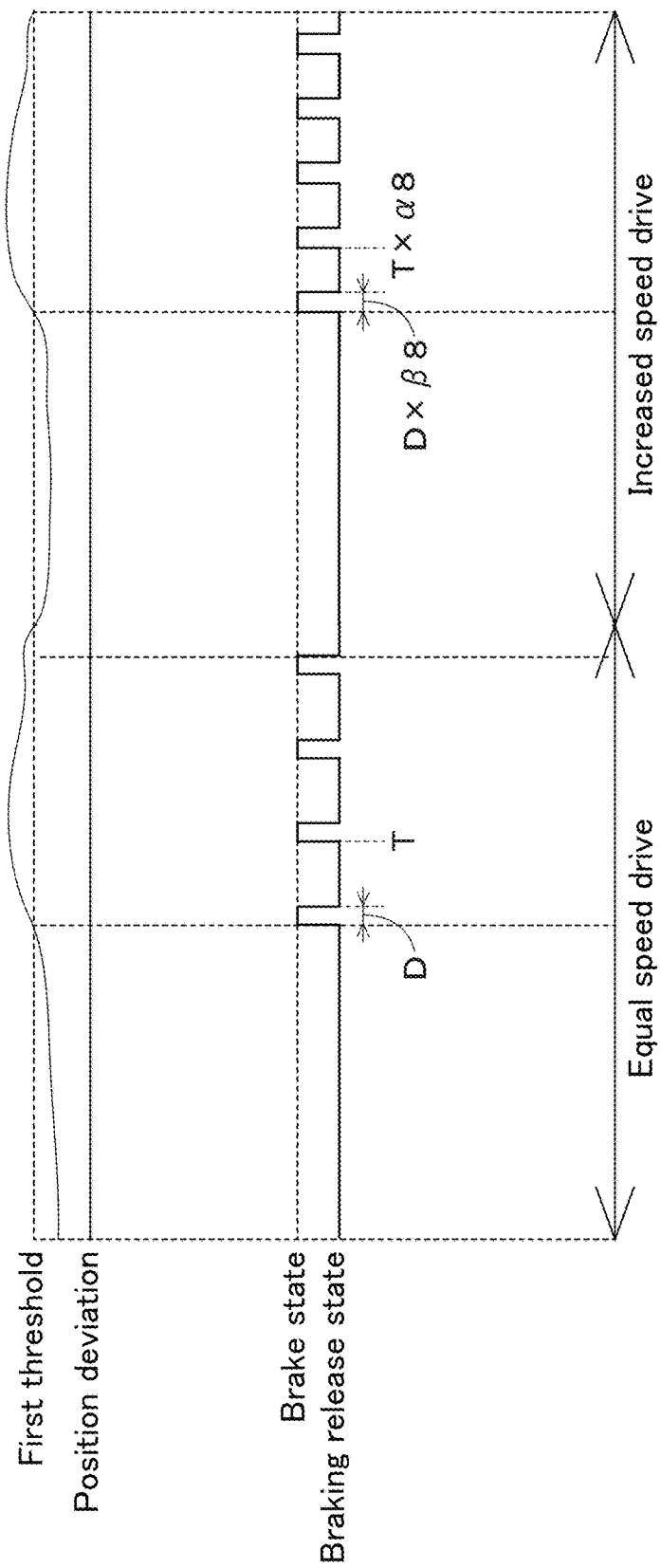

WORKING MACHINE

CROSS REFERENCE TO RELATED APPLICATIONS

This application is a continuation application of International Application No. PCT/JP2020/046348, filed on Dec. 11, 2020, which claims the benefit of priority to Japanese Patent Application No. 2019-228669, filed on Dec. 18, 2019. The entire contents of each of these applications are hereby incorporated herein by reference.

BACKGROUND OF THE INVENTION

1. Field of the Invention

The present invention relates to a working machine.

2. Description of the Related Art

In the related art, the working machine in Japanese Unexamined Patent Application Publication No. 2019-4731 includes a steering device capable of changing the orientation of a machine body, a first wheel provided on the machine body, a second wheel provided on the machine body and separated from the first wheel in a machine-body width direction, a braking device that performs braking of either the first wheel or the second wheel, and a controller having a first control unit that sets a steering angle of the steering device based on a planned traveling route, and a second control unit that causes the braking device to perform braking of either the first wheel or the second wheel based on the planned traveling route.

SUMMARY OF THE INVENTION

The second control unit in Japanese Unexamined Patent Application Publication No. 2019-4731 can return the working machine to the planned traveling route by causing the braking device to perform the braking.

However, when the braking device is continuously caused to perform the braking to return the position of the machine body to the planned traveling route, the wheels (the first wheel and the second wheel) may be dragged and damage an agricultural field.

Preferred embodiments of the present invention provide working machines each capable of returning to a planned traveling route easily while reducing or preventing damage of an agricultural field.

A working machine according to one aspect of a preferred embodiment of the present invention includes a machine body, a steering device capable of changing an orientation of the machine body, a first wheel provided on the machine body, a second wheel provided on the machine body and separated from the first wheel in a machine-body width direction, a rotational difference generator to cause a rotational difference between the first wheel and the second wheel, and a controller configured or programmed to include a first control unit to set a steering angle of the steering device based on a planned traveling route, and a second control unit that controls the rotational difference generating device based on the planned traveling route to cause a rotational difference between the first wheel and the second wheel.

The rotational difference generator may include a braking device to cause a rotational difference between the first wheel and the second wheel by switching between a brake state in which at least one of the first wheel and the second wheel is braked and a release state in which the at least one of the first wheel and the second wheel is not braked. Based on the planned traveling route, the second control unit may be configured or programmed to cause the braking device to perform setting about braking of either the first wheel or the second wheel by performing pumping control in which switching between the brake state and the release state is repeated.

The planned traveling route may include a straight travel section in which the machine body travels straight and a turn section in which the machine body turns. The second control unit may be configured or programmed to perform the pumping control when the machine body is positioned in the turn section.

The second control unit may be configured or programmed to set either a cycle at which the brake state and the release state are switched in the pumping control or a duty ratio at which the brake state is performed in the cycle.

The working machine may include a front wheel at a front portion of the machine body and a steering angle of which is changeable by the steering device, and a transmission to perform speed-shifting. The first wheel and the second wheel may be each a rear wheel at a rear portion of the machine body. The transmission may be switchable between an equal speed drive in which both the front wheel and the rear wheel are driven at an equal or approximately equal speed and an increased speed drive in which the front wheel is driven faster than the rear wheel. The second control unit may be configured or programmed to set the duty ratio to be different between the equal speed drive and the increased speed drive.

The second control unit may be configured or programmed to set the duty ratio for the increased speed drive to be higher than the duty ratio for the equal speed drive.

For the equal speed drive, the second control unit may be configured or programmed to set the duty ratio in accordance with the speed of the machine body.

For the equal speed drive, the second control unit may be configured or programmed to set the duty ratio when the steering angle caused by the steering device is more than or equal to a predetermined steering angle.

The working machine may include a front wheel at a front portion of the machine body and a steering angle of which is changeable by the steering device, and a transmission to perform speed-shifting. The first wheel and the second wheel may be each a rear wheel at a rear portion of the machine body. The transmission may be switchable between an equal speed drive in which both the front wheel and the rear wheel are driven at an equal speed and an increased speed drive in which the front wheel is driven faster than the rear wheel. The second control unit may be configured or programmed to set the cycle to be different between the equal speed drive and the increased speed drive.

The second control unit may be configured or programmed to set the cycle for the increased speed drive to be shorter than the cycle for the equal speed drive.

The first wheel and the second wheel may be of a tire type or a crawler type. The second control unit may be configured or programmed to set the duty ratio to be different between the tire type and the crawler type.

The second control unit may be configured or programmed to set the duty ratio for the tire type to be higher than the duty ratio for the crawler type.

The first control unit may be configured or programmed to perform automated traveling in which the speed of the machine body is changed based on the planned traveling route.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 4 is a diagram describing a cycle and a duty ratio of a braking device.

FIG. 5A is a first diagram describing setting of the cycle and the duty ratio by a pumping setting unit.

FIG. 6A is a third diagram describing setting of the cycle and the duty ratio by the pumping setting unit.

FIG. 6E is a seventh diagram describing setting of the cycle and the duty ratio by the pumping setting unit.

FIG. 6G is a ninth diagram describing setting of the cycle and the duty ratio by the pumping setting unit.

FIG. 6I is an eleventh diagram describing setting of the cycle and the duty ratio by the pumping setting unit.

DETAILED DESCRIPTION OF THE PREFERRED EMBODIMENTS

Figure 1:
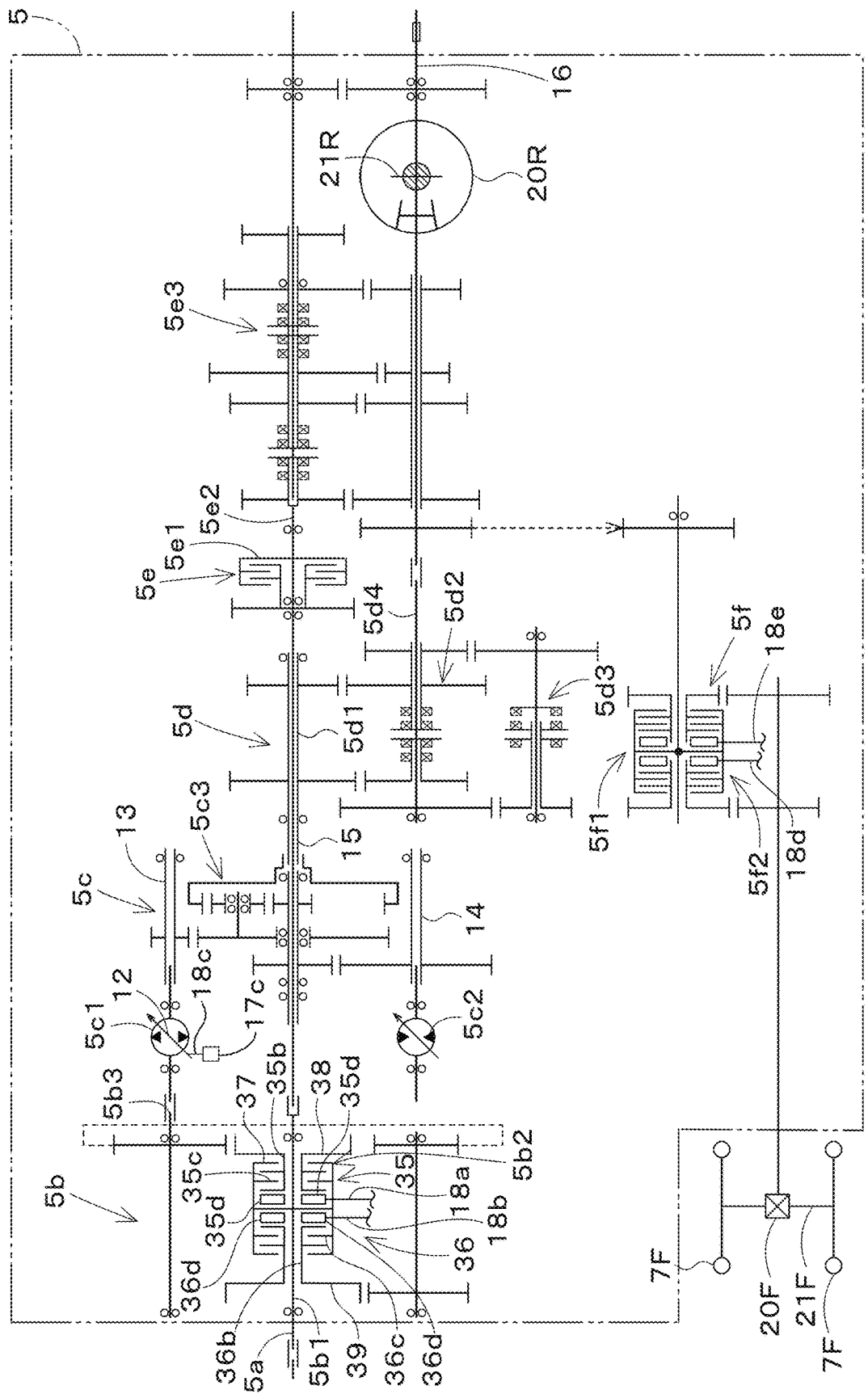
FIG. 1 is a configuration diagram of a transmission.

The preferred embodiments will now be described with reference to the accompanying drawings, wherein like reference numerals designate corresponding or identical elements throughout the various drawings. The drawings are to be viewed in an orientation in which the reference numerals are viewed correctly.

Hereinafter, preferred embodiments of the present invention will be described with reference to the drawings.

Figure 7:
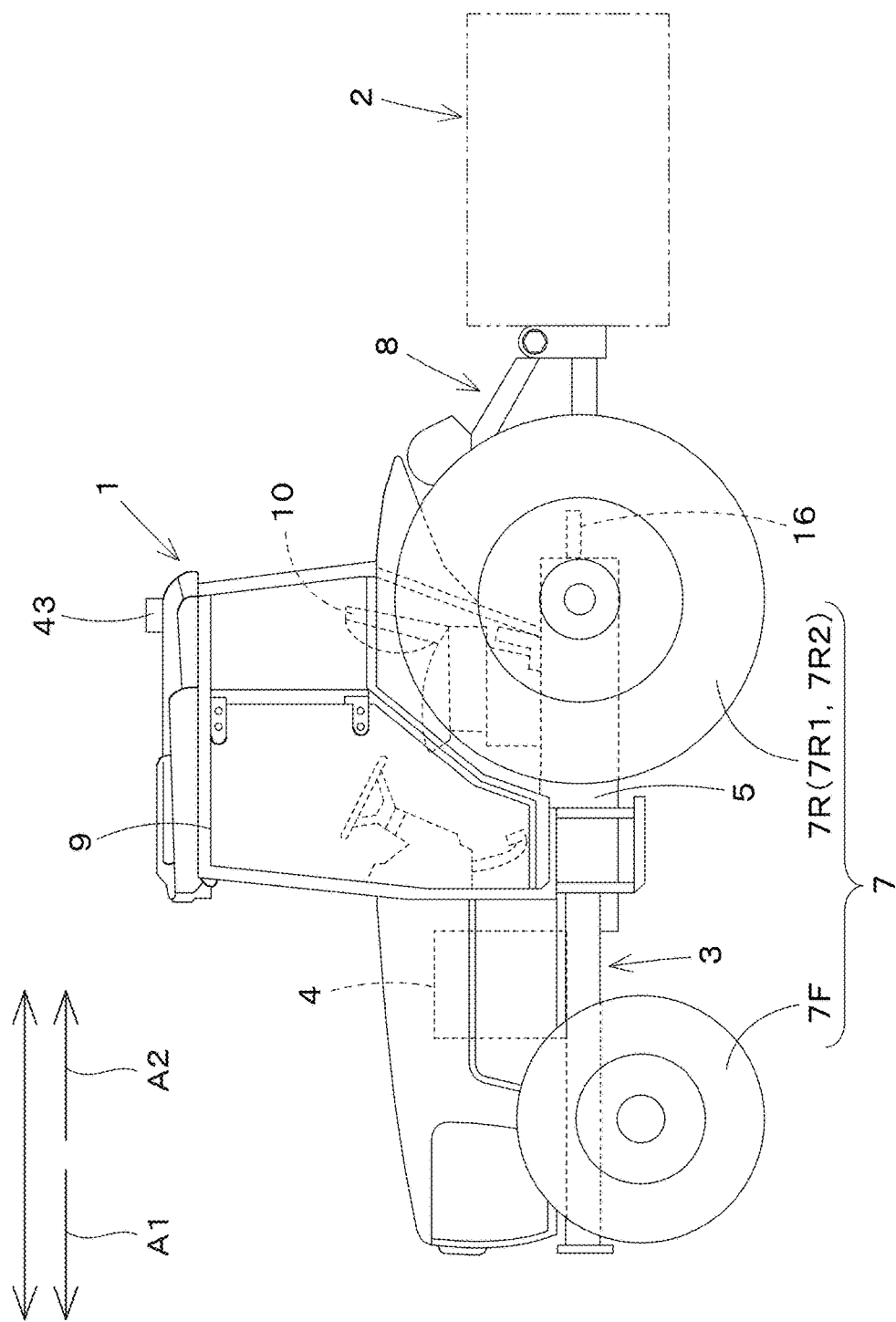
FIG. 7 is a side general view of a working machine.

FIG. 7 illustrates a tractor as an example of a working machine 1. Although a tractor will be described as an example of the working machine 1 in the present preferred embodiment, the working machine 1 is not limited to a tractor and may be an agricultural machine, such as a rice transplanter, that performs agricultural work, or a construction machine, such as a backhoe, that performs construction work. In the description of the present preferred embodiment of the present invention, the forward direction (the arrow A1 direction in FIG. 7) of an operator (driver) sitting on an operator's seat 10 of the working machine 1 is referred to as the front, the rearward direction (the arrow A2 direction in FIG. 7) of the operator is referred to as the rear, the leftward direction of the operator is referred to as the left, and the rightward direction of the operator is referred to as the right. In the description, the horizontal direction, which is a direction orthogonal to the front-rear direction of the working machine 1, is referred to as the width direction.

As illustrated in FIG. 7, the working machine 1 includes a traveling vehicle (machine body) 3 having a traveling device 7 and capable of traveling, a prime mover 4, a transmission 5, and a steering device 11. The traveling device 7 is a device that has a front wheel 7F and a rear wheel 7R. The rear wheel 7R includes a first wheel 7R1 provided on one side (left side) of the machine body 3 in a machine-body width direction, and a second wheel 7R2 provided on the other side (right side) of the machine body 3 in the machine-body width direction. The second wheel 7R2 is separated from the first wheel 7R1 in the machine-body width direction. The front wheel 7F may be of a tire type or a crawler type. The rear wheel 7R also may be of a tire type or a crawler type. The prime mover 4 is an internal combustion engine, such as a gasoline engine or a diesel engine, an electric motor, or the like. In this preferred embodiment, the prime mover 4 is a diesel engine.

The transmission 5 is capable of switching the propulsive force of the traveling device 7 by gear shifting and capable of switching between forward traveling and reverse traveling of the traveling device 7. The machine body 3 is provided with a cabin 9, and the operator's seat 10 is disposed in the cabin 9.

As illustrated in FIG. 7, a rear portion of the machine body 3 is provided with a lifting apparatus 8. A working device 2 is attachable to and detachable from the lifting apparatus 8. The lifting apparatus 8 is capable of raising and lowering the working device 2 mounted thereon. The working device 2 is, for example, a cultivator for cultivation, a fertilizer spreader for spreading a fertilizer, an agricultural chemical spreader for spreading an agricultural chemical, a harvester for harvesting, a mower for mowing grass or the like, a tedder for tedding grass or the like, a rake for raking grass or the like, or a baler for baling grass or the like.

Figure 2:
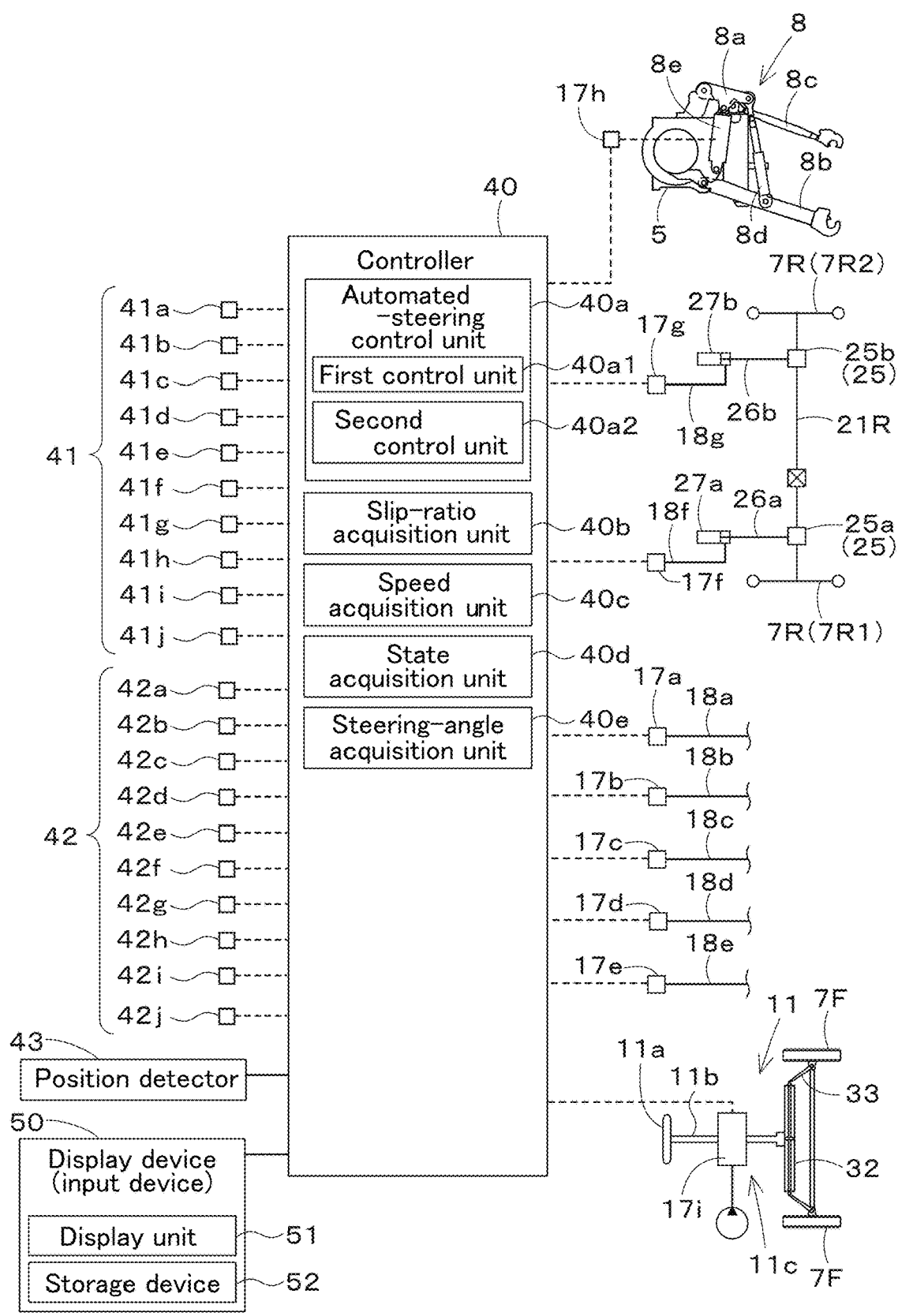
FIG. 2 is a control block diagram of a working machine.

As illustrated in FIG. 2, the working machine 1 includes a display device 50. The display device 50 is a device that has a display unit 51 including either a liquid crystal panel, a touch panel, or the other panel; and a storage device 52. The display unit 51 is capable of displaying various information on the working machine 1, in addition to information for assisting traveling of the working machine 1. The storage device 52 is a nonvolatile memory or the like and stores information and the like to be displayed on the display unit 51. The display device 50 is connected to a device included in the working machine 1 in a wired or wireless manner such that communication is enabled.

As illustrated in FIG. 1, the transmission 5 includes a main shaft (propeller shaft) 5a, a shuttle unit 5b, a main transmission unit 5c, a sub-transmission unit 5d, a PTO power transmission unit 5e, and a front transmission unit 5f. The propeller shaft 5a is rotatably supported by a housing case of the transmission 5, and power from a crankshaft of the prime mover 4 is transmitted to the propeller shaft 5a.

As illustrated in FIG. 1, the shuttle unit 5b has a shuttle shaft 5b1 and a forward-reverse switching unit 5b2. Power from the propeller shaft 5a is transmitted to the shuttle shaft 5b1. The forward-reverse switching unit 5b2 includes, for example, a hydraulic clutch or the like. The hydraulic clutch is turned on and off to switch the rotation direction of the shuttle shaft $5b1$, in other words, forward traveling and reverse traveling of the working machine 1. Specifically, the forward-reverse switching unit $5b2$ has a forward clutch unit 35 and a reverse clutch unit 36. The forward clutch unit 35 and the reverse clutch unit 36 have a housing 37 that rotates integrally with the propeller shaft $5a$.

As illustrated in FIG. 1, the forward clutch unit 35 has a cylindrical shaft $35b$, a friction plate $35c$ disposed between the housing 37 and the cylindrical shaft $35b$, and a press member $35d$. The press member $35d$ is urged by an urging member such as a spring (not illustrated) in a direction away from the friction plate $35c$.

As illustrated in FIG. 1, a first fluid passage $18a$ through which a hydraulic fluid is supplied and discharged is connected to the inside of the housing 37 on the forward clutch unit 35 side. As illustrated in FIG. 2, the first fluid passage $18a$ is connected to a first control valve $17a$. When the opening degree of the first control valve $17a$ is changed and the hydraulic fluid is supplied to the inside of the housing 37 through the first fluid passage $18a$, the press member $35d$ moves against the urging force of the spring to the pressing side (connection side), thereby causing the friction plate $35c$ to be in pressure contact with any portion on the housing 37 side and causing the forward clutch unit 35 to be in a connected state. The power of the propeller shaft $5a$ is transmitted to a gear 38 that rotates integrally with the cylindrical shaft $35b$. When the hydraulic fluid is discharged from the inside of the housing 37 into the first fluid passage $18a$, the press member $35d$ moves due to the urging force of the spring to the disconnection side, thereby causing the friction plate $35c$ to be separated from any part on the housing 37 side and causing the forward clutch unit 35 to be in a disconnected state. The power of the propeller shaft $5a$ is not transmitted to the gear 38. The gear (output gear) 38 on the output side of the forward clutch unit 35 engages with an output shaft $5b3$. When the forward clutch unit 35 is in the connected state, a driving force is transmitted to the output shaft $5b3$.

As illustrated in FIG. 1, the reverse clutch unit 36 has a cylindrical shaft $36b$, a friction plate $36c$ disposed between the housing 37 and the cylindrical shaft $36b$, and a press member $36d$. The press member $36d$ is urged by an urging member such as a spring (not illustrated) in a direction away from the friction plate $36c$.

As illustrated in FIG. 1, a second fluid passage $18b$ through which the hydraulic fluid is supplied and discharged is connected to the inside of the housing 37 on the reverse clutch unit 36 side. As illustrated in FIG. 2, the second fluid passage $18b$ is connected to a second control valve $17b$. When the opening degree of the second control valve $17b$ is changed and the hydraulic fluid is supplied to the inside of the housing 37 through the second fluid passage $18b$, the press member $36d$ moves against the urging force of the spring to the pressing side (connection side), thereby causing the friction plate $36c$ to be in pressure contact with the side of the housing 37 and causing the reverse clutch unit 36 to be in a connected state. The power of the propeller shaft $5a$ is transmitted to a gear 39 that rotates integrally with the cylindrical shaft $36b$. When the hydraulic fluid is discharged from the side of the housing 37 into the second fluid passage $18b$, the press member $36d$ moves due to the urging force of the spring to the disconnection side, thereby causing the friction plate $36c$ to be separated from any portion on the housing 37 side and causing the reverse clutch unit 36 to be in a disconnected state. The power of the propeller shaft $5a$ is not transmitted to the gear 39. The gear (output gear) 39 on the output side of the reverse clutch unit 36 engages with the output shaft $5b3$. When the reverse clutch unit 36 is in the connected state, a driving force is transmitted to the output shaft $5b3$.

The main transmission unit $5c$ is a continuously variable transmission mechanism that changes input power continuously. As illustrated in FIG. 1, the continuously variable transmission mechanism has a hydraulic pump $5c1$, a hydraulic motor $5c2$, and a planetary gear mechanism $5c3$. The hydraulic pump $5c1$ is rotated by the power from the output shaft $5b3$ of the shuttle unit $5b$. The hydraulic pump $5c1$ is, for example, a variable displacement pump having a swash plate 12 and can change the flow rate of the hydraulic fluid output from the hydraulic pump $5c1$ by changing the angle (swash plate angle) of the swash plate 12. The hydraulic motor $5c2$ is a motor that is rotated by the hydraulic fluid output from the hydraulic pump $5c1$ via a fluid passage such as a pipe. The rotation speed of the hydraulic motor $5c2$ can be changed by changing the swash plate angle of the hydraulic pump $5c1$ or changing the power to be input to the hydraulic pump $5c1$.

As illustrated in FIG. 1, the planetary gear mechanism $5c3$ is a mechanism including a plurality of gears (cogwheels) and power transmission shafts including input shafts, an output shaft, and the like. The planetary gear mechanism $5c3$ includes an input shaft 13 to which the power of the hydraulic pump $5c1$ is input, an input shaft 14 to which the power of the hydraulic motor $5c2$ is input, and an output shaft 15 that outputs power. The planetary gear mechanism $5c3$ combines the power of the hydraulic pump $5c1$ and the power of the hydraulic motor $5c2$ and transmits the combined power to the output shaft 15.

Therefore, with the main transmission unit $5c$, it is possible to change the power that is to be output to the sub-transmission unit $5d$ by changing the swash plate angle of the swash plate 12 of the hydraulic pump $5c1$, the rotation speed of the prime mover 4, or the like.

In the present preferred embodiment, the angle of the swash plate 12 can be changed by the hydraulic fluid supplied from a third control valve $17c$. The swash plate 12 and the third control valve $17c$ are connected by, for example, a third fluid passage $18c$ through which the hydraulic fluid is supplied and discharged. The third control valve $17c$ is a two-position switching valve with a solenoid valve and can control the angle of the swash plate 12, in other words, change the power that is to be output to the sub-transmission unit $5d$ by energizing or deenergizing a solenoid of the solenoid valve to thereby control the hydraulic fluid that flows in the third fluid passage $18c$. The main transmission unit $5c$, which includes a continuously variable transmission mechanism, may be a multispeed transmission mechanism that performs gear shifting by using gears.

The sub-transmission unit $5d$ is a transmission mechanism having multispeed gears (cogwheels) that perform gear shifting of power. The sub-transmission unit $5d$ changes the power input from the output shaft 15 of the planetary gear mechanism $5c3$ to the sub-transmission unit $5d$ by changing the connection (engagement) of the plurality of gears, as appropriate, and outputs the power (performs gear shifting). As illustrated in FIG. 1, the sub-transmission unit $5d$ includes an input shaft $5d1$, a first gearshift clutch $5d2$, a second gearshift clutch $5d3$, and an output shaft $5d4$. The input shaft $5d1$ is a shaft to which the power of the output shaft 15 of the planetary gear mechanism $5c3$ is input. The input shaft $5d1$ inputs the input power to the first gearshift clutch $5d2$ and the second gearshift clutch $5d3$ via a gear and the like. The input power is changed by switching between connection and disconnection of each of the first gearshift clutch 5d2 and the second gearshift clutch 5d3 and is output to the output shaft 5d4. The power output to the output shaft 5d4 is transmitted to a rear-wheel differential 20R. The rear-wheel differential 20R rotatably supports a rear axle 21R on which the rear wheel 7R is mounted.

As illustrated in FIG. 1, the PTO power transmission unit 5e has a PTO clutch 5e1, a PTO propeller shaft 5e2, and a PTO gearshift unit 5e3. The PTO clutch 5e1 includes, for example, a hydraulic clutch or the like and is switched between a state in which the power of the propeller shaft 5a is transmitted to the PTO propeller shaft 5e2 and a state in which the power of the propeller shaft 5a is not transmitted to the PTO propeller shaft 5e2 by connection and disconnection of the hydraulic clutch. The PTO gearshift unit 5e3 includes a gearshift clutch, a plurality of gears, and the like and changes and outputs the power (rotation speed) input to the PTO gearshift unit 5e3 from the PTO propeller shaft 5e2. The power from the PTO gearshift unit 5e3 is transmitted to a PTO shaft 16 via a gear and the like.

As illustrated in FIG. 1, the front transmission unit 5f has a first front gearshift clutch 5f1 and a second front gearshift clutch 5f2. The power from the sub-transmission unit 5d can be transmitted to the first front gearshift clutch 5f1 and the second front gearshift clutch 5f2. For example, the power of the output shaft 5d4 is transmitted to the first front gearshift clutch 5f1 and the second front gearshift clutch 5f2 via a gear and a power transmission shaft. The power from the first front gearshift clutch 5f1 and the second front gearshift clutch 5f2 can be transmitted to a front axle 21F via a front power transmission shaft 22. Specifically, the front power transmission shaft 22 is connected to a front-wheel differential 20F. The front-wheel differential 20F rotatably supports the front axle 21F on which the front wheel 7F is mounted.

As illustrated in FIG. 1, the first front gearshift clutch 5f1 and the second front gearshift clutch 5f2 each includes a hydraulic clutch and the like. A fourth fluid passage 18d is connected to the first front gearshift clutch 5f1, and the fluid passage is connected to a fourth control valve 17d to which the hydraulic fluid output from the hydraulic pump is supplied, as illustrated in FIG. 2. The first front gearshift clutch 5f1 is switched between a connected state and a disconnected state in accordance with the opening degree of the fourth control valve 17d. As illustrated in FIG. 1, a fifth fluid passage 18e is connected to the second front gearshift clutch 5f2, and is connected to a fifth control valve 17e, as illustrated in FIG. 2. The second front gearshift clutch 5f2 is switched between a connected state and a disconnected state in accordance with the opening degree of the fifth control valve 17e. The fourth control valve 17d and the fifth control valve 17e are each, for example, a two-position switching valve with a solenoid valve and are switched to the connected state or the disconnected state by energizing or deenergizing of a solenoid of the solenoid valve.

When the first front gearshift clutch 5f1 is in the disconnected state and the second front gearshift clutch 5f2 is in the connected state, the power of the sub-transmission unit 5d is transmitted to the front wheel 7F through the second front gearshift clutch 5f2. Consequently, four wheel drive (4WD) in which the front wheel 7F and the rear wheel 7R are driven by power is performed, and the rotation speeds of the front wheel 7F and the rear wheel 7R become substantially equal to each other (4WD equal speed state, equal speed drive). When the first front gearshift clutch 5f1 is in the connected state and the second front gearshift clutch 5f2 is in the disconnected state, four-wheel drive is performed, and the rotation speed of the front wheel 7F becomes faster than the rotation speed of the rear wheel 7R (4WD increased speed state, increased speed drive). When the first front gearshift clutch 5f1 and the second front gearshift clutch 5f2 are in the connected state, the power of the sub-transmission unit 5d is not transmitted to the front wheel 7F. Thus, two wheel drive (2WD) in which the rear wheel 7R is driven by power is performed. The configuration of the transmission 5 is not limited to the aforementioned configuration as long as the transmission 5 is capable of switching forward traveling, reverse traveling, and the like of the traveling device 7.

As illustrated in FIG. 2, the working machine 1 includes a braking device 25. The braking device 25 has a left braking device 25a and a right braking device 25b. Each of the left braking device 25a and the right braking device 25b is the braking device 25 of a disc type and can be switched between a brake state in which braking is performed and a release state in which braking is released. The left braking device 25a is provided on the left side of the rear axle 21R and performs braking of the rear wheel 7R (first wheel 7R1) at the left. The right braking device 25b is provided on the right side of the rear axle 21R and performs braking of the rear wheel 7R (second wheel 7R2) at the right.

In the vicinity of the operator's seat 10, for example, a left brake pedal (not illustrated) and a right brake pedal (not illustrated) are provided. In response to the left brake pedal being operated (stepped) by an operator that operates the working machine 1, a left coupling member 26a coupled to the left brake pedal moves in a braking direction and can cause the left braking device 25a to enter the brake state. In response to the right brake pedal being operated (stepped) by the operator, a right coupling member 26b coupled to the right brake pedal moves in the braking direction and can cause the right braking device 25b to enter the brake state.

A left hydraulic actuation unit 27a that is actuated by the hydraulic fluid is coupled to the left coupling member 26a. A sixth control valve 17f is connected to the left hydraulic actuation unit 27a via a sixth fluid passage 18f. The left coupling member 26a can be moved in the braking direction by actuating the left hydraulic actuation unit 27a by the sixth control valve 17f. A right hydraulic actuation unit 27b that is actuated by the hydraulic fluid is coupled to the right coupling member 26b. A seventh control valve 17g is connected to the right hydraulic actuation unit 27b via a seventh fluid passage 18g. The right coupling member 26b can be moved in the braking direction by actuating the right hydraulic actuation unit 27b by the seventh control valve 17g.

As described above, the left braking device 25a and the right braking device 25b can cause the rear wheel 7R (first wheel 7R1) at the left and the rear wheel 7R (second wheel 7R2) at the right, respectively, to be in the brake state independently not only by the operation of the left brake pedal and the right brake pedal but also by actuation of the left hydraulic actuation unit 27a and the right hydraulic actuation unit 27b. In the present preferred embodiment, the left braking device 25a is provided on the left side of the rear axle 21R, the right braking device 25b is provided on the right side of the rear axle 21R, and the braking device 25 performs braking of the rear wheel 7R of the wheels 7F and 7R. However, instead of or in addition to the left braking device 25a and the right braking device 25b, the braking device 25 may be provided on each of the left side and the right side of the front axle 21F and perform braking of each of the front wheels 7F.

As illustrated in FIG. 2, the lifting apparatus 8 has lift arms 8a, lower links 8b, a top link 8c, a lift rod 8d, and a lift cylinder 8e. A front end portion of each of the lift arms 8a is supported to be swingable upward or downward at a rear upper portion of a case (transmission case) that houses the transmission 5. The lift arm 8a is swung (raised and lowered) by the drive of the lift cylinder 8e. The lift cylinder 8e includes a hydraulic cylinder. The lift cylinder 8e is connected to the hydraulic pump via an eighth control valve 17h. The eighth control valve 17h is a solenoid valve or the like and extends and contracts the lift cylinder 8e.

As illustrated in FIG. 2, a front end portion of each of the lower links 8b is supported to be swingable upward or downward at a rear lower portion of the transmission 5. A front end portion of the top link 8c is supported above the lower links 8b to be swingable upward or downward at a rear portion of the transmission 5. The lift rod 8d couples the lift arm 8a and the lower link 8b to each other. The working device 2 is coupled to a rear portion of the lower link 8b and a rear portion of the top link 8c. When the lift cylinder 8e is driven (extended and contracted), the lift arms 8a are raised or lowered, and the lower links 8b coupled to the lift arms 8a via the lift rods 8d are raised or lowered. Consequently, the working device 2 is swung (raised or lowered) upward or downward with a front portion of the lower links 8b as the fulcrum.

As illustrated in FIG. 2, the steering device (steering mechanism) 11 is capable of changing the orientation of the machine body 3 by changing the steering angle of the traveling device 7. The steering device 11 has a steering handle (steering wheel) 11a, a rotary shaft (steering shaft) 11b that rotates along with the rotation of the steering handle 11a, and an assist mechanism (power steering mechanism) 11c that assists steering of the steering handle 11a. The steering handle 11a is a member for operating steering of the machine body 3 and is manually operated by an operator. The assist mechanism 11c includes a ninth control valve 17i and a steering cylinder 32. The ninth control valve 17i is, for example, a three-position switching valve that can be switched by a move of a spool or the like. The ninth control valve 17i can be switched also by steering of the rotary shaft 11b. The steering cylinder 32 is connected to an arm (knuckle arm) 33 that changes the orientation of the front wheel 7F. Therefore, when the steering handle 11a is operated, the switch position and the opening degree of the ninth control valve 17i are switched in response to the steering handle 11a, the steering cylinder 32 is extended or contracted leftward or rightward in accordance with the switch position and the opening degree of the ninth control valve 17i, and it is thereby possible to change the steering direction of the front wheel 7F. The steering device 11 described above is an example and is not limited to having the configuration described above.

As illustrated in FIG. 2, the working machine 1 includes a controller 40. The controller 40 is a device that performs various control operations of the working machine 1. A plurality of detectors 41 are connected to the controller 40. The plurality of detectors 41 are detectors to detect states of the working machine 1 and include, for example, a water temperature sensor 41a to detect the temperature of water, a fuel sensor 41b to detect the remaining amount of fuel, a prime mover rotation sensor (rotation sensor) 41c to detect the rotation speed of the prime mover 4, an accelerator pedal sensor 41d to detect the operation amount of an accelerator 42f, a steering angle sensor 41e to detect the steering angle of the steering device 11, an angle sensor 41f to detect the angle of the lift arm 8a, a tilt detection sensor 41g to detect the tilt of the machine body 3 in the width direction (the right direction or the left direction), a rotation speed sensor 41h to detect the rotation speeds of the wheels 7F and 7R, a PTO rotation sensor (rotation sensor) 41i to detect the rotation speed of the PTO shaft 16, a battery sensor 41j to detect the voltage of a storage battery such as a battery, and the like. The rotation speed sensor 41h can detect the rotation speeds of the wheels 7F and 7R based on, for example, the rotation speed of the front axle 21F and the rotation speed of the rear axle 21R. The rotation speed sensor 41h can also detect the rotation direction of any of the front axle 21F, the rear axle 21R, the front wheel 7F, or the rear wheel 7R and can also detect whether the working machine 1 (machine body 3) performs forward traveling or reverse traveling. The detectors 41 described above are examples and are not limited to the sensors described above.

A plurality of operation members 42 are connected to the controller 40. The plurality of operation members 42 include a forward-reverse switching lever (shuttle lever) 42a to switch between forward traveling and reverse traveling of the machine body 3, an ignition switch 42b to perform starting and the like of the prime mover 4, a PTO gear shift lever 42c to set the rotation speed of the PTO shaft 16, a gearshift switching switch 42d to switch between automatic gearshift and manual gearshift, a gear shift lever 42e to manually switch gear positions (gear shift levels) of the transmission 5, the accelerator 42f to increase and decrease vehicle speed, a raising/lowering switch 42g to operate raising and lowering of the lifting apparatus 8, an upper-limit setting dial 42h to set the upper limit of the lifting apparatus 8, a vehicle speed lever 42i to set vehicle speed, a switching tool 42j to perform switching operation of the equal speed drive, the increased speed drive, and the 2WD of the transmission 5, and the like. The operation members 42 described above are examples and are not limited to the operation members 42 described above.

The working machine 1 may include a position detector 43 to detect the position (machine body position W1) of the machine body 3, and an automated-steering control unit 40a to control automated steering of the machine body 3 based on the machine body position W1 and may be configured to perform automated steering. In such a case, the position detector 43 can detect the own (machine body 3) position (measured position information including latitude and longitude) via a satellite positioning system (positioning satellite) such as D-GPS, GPS, GLONASS, Hokuto, Galileo, Michibiki, or the like. In other words, the position detector 43 receives a satellite signal (the position of a positioning satellite, transmission time, correction information, and the like) transmitted from a positioning satellite and detects the position (for example, the latitude and the longitude) of the working machine 1 based on the satellite signal. As illustrated in FIG. 7, the position detector 43 is provided on an upper portion (roof) of the cabin 9 covering the operator's seat 10 of the working machine 1 in the present preferred embodiment. The mounting position and the configuration of the position detector 43 are not limited to the aforementioned configurations as long as the position detector 43 is capable of detecting the position of the working machine 1.

As illustrated in FIG. 2, the controller 40 has the automated-steering control unit 40a. The automated-steering control unit 40a includes an electric/electronic circuit provided in the controller 40, a program stored in a CPU or the like, and the like. The automated-steering control unit 40a controls the assist mechanism 11c such that the machine body 3 travels along a planned traveling route L based on a control signal output from the controller 40. The automated-steering control unit 40*a* includes a first control unit 40*a*1. The first control unit 40*a*1 sets the steering angle of the steering device 11 based on the planned traveling route L. The planned traveling route L is set by using a computer, such as a personal computer (PC) connected to the working machine 1 such that communication is enabled, a smartphone (multifunctional mobile telephone), or a tablet. As illustrated in FIG. 3B, the planned traveling route L includes a straight travel section L1 in which the machine body 3 travels straight and a turn section L2 in which the machine body 3 turns.

The first control unit 40*a*1 performs a control such that the machine body 3 travels along the planned traveling route L under a situation in which the working machine 1 performs automated traveling. In other words, when the deviation between the machine body 3 and the planned traveling route L is less than a first set value previously set, an automated-traveling control unit 60*a* maintains the rotation angle of the rotary shaft 11*b*. When the deviation between the machine body 3 and the planned traveling route L is more than or equal to the first set value, the automated-traveling control unit 60*a* rotates the rotary shaft 11*b* such that the deviation is zero.

Figure 3A:
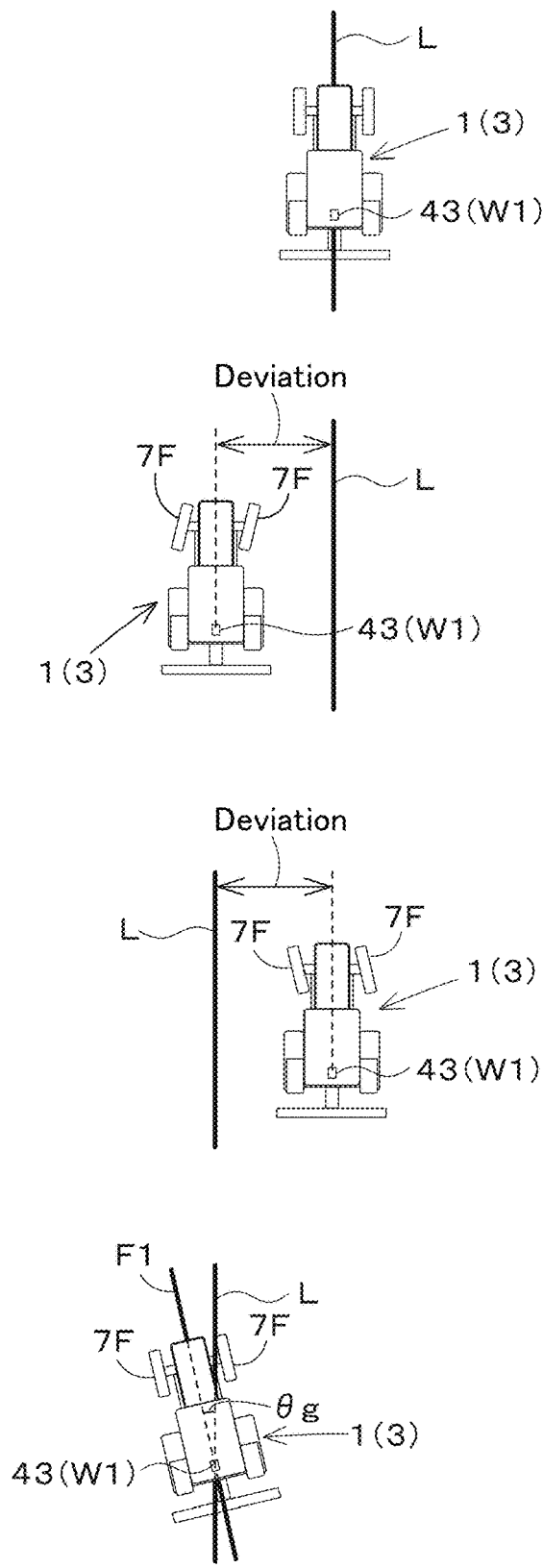
FIG. 3A is a diagram describing automated traveling.
Figure 3B:
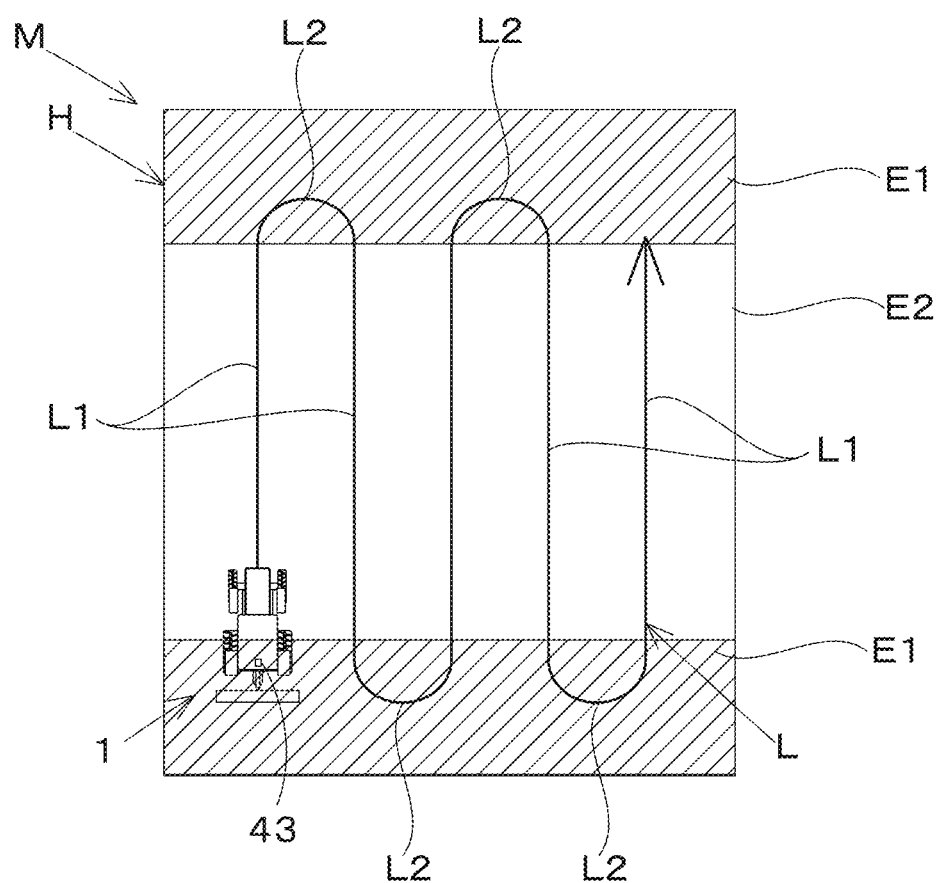
FIG. 3B is a diagram describing a planned traveling route.

Specifically, as illustrated in FIG. 3A, when the deviation (position deviation) between the machine body position W1 and the planned traveling route L is less than the first set value previously set, the first control unit 40*a*1 maintains the rotation angle of the rotary shaft 11*b*. When the position deviation between the machine body position W1 and the planned traveling route L is more than or equal to the first set value and when the working machine 1 is positioned on the left side of the planned traveling route L, the first control unit 40*a*1 rotates the rotary shaft 11*b* such that the steering direction of the working machine 1 is the right direction. When the position deviation between the machine body position W1 and the planned traveling route L is more than or equal to the first set value and when the working machine 1 is positioned on the right side of the planned traveling route L, the first control unit 40*a*1 rotates the rotary shaft 11*b* such that the steering direction of the working machine 1 is the left direction.

In the preferred embodiment described above, the steering angle of the steering device 11 is changed based on the position deviation between the machine body position W1 and the planned traveling route L. However, as illustrated in FIG. 3A, when the course of the planned traveling route L and the course (machine body course) F1 of the running direction (traveling direction) of the working machine 1 (machine body 3) differ from each other, in other words, when an angle (course deviation) θg of the machine body course F1 with respect to the planned traveling route L is more than or equal to a second set value, the first control unit 40*a*1 may set the steering angle such that the angle θg is zero (the machine body course F1 coincides with the course of the planned traveling route L). The first control unit 40*a*1 may set the final steering angle for automated traveling based on a steering angle obtained based on the deviation (position deviation) and a steering angle obtained based on the angle (course deviation) θg. Setting of the steering angle for automated traveling in the preferred embodiment described above is an example and is not limited.

The first control unit 40*a*1 controls the machine body speed based on the planned traveling route L when automated traveling is started. Specifically, for example, the first control unit 40*a*1 controls the machine body speed that is different between the straight travel section L1 and the turn section L2. For example, for the straight travel section L1, the first control unit 40*a*1 sets the machine body speed to a speed v1. For the turn section L2, the first control unit 40*a*1 sets the machine body speed to a speed v2 slower than the speed v1. Control of the machine body speed is not limited to the aforementioned configuration. The first control unit 40*a*1 may divide the straight travel section L1 into a plurality of sections and set a different machine body speed for each of the sections.

The working machine 1 can cause a rotational difference between the first wheel 7R1 and the second wheel 7R2 and change and turn the machine body course F1. The working machine 1 includes a rotational difference generating device that causes a rotation difference between the first wheel 7R1 and the second wheel 7R2. The automated-steering control unit 40*a* has a second control unit 40*a*2 that controls the rotation difference generating device to cause a rotational difference between the first wheel 7R1 and the second wheel 7R2.

The rotational difference generating device causes a rotational difference between the first wheel 7R1 and the second wheel 7R2 by performing braking of each of the first wheel 7R1 and the second wheel 7R2 independently or transmitting an independent driving force to each of the first wheel 7R1 and the second wheel 7R2. When the rotational difference generating device increases the rotation speed of the first wheel 7R1 to be higher than that of the second wheel 7R2, the leftward propulsive force of the machine body 3 becomes larger than the rightward propulsive force, and the machine body 3 travels such that the machine body course F1 is directed to the right. When the rotational difference generating device increases the rotation speed of the second wheel 7R2 to be higher than that of the first wheel 7R1, the rightward propulsive force of the machine body 3 becomes larger than the leftward propulsive force, and the machine body 3 travels such that the machine body course F1 is directed to the left.

In the present preferred embodiment, the rotational difference generating device is the braking device 25 described above. The braking device 25 causes a rotational difference between the first wheel 7R1 and the second wheel 7R2 by switching at least one of the left braking device 25*a* and the right braking device 25*b* between the brake state in which braking is performed and the release state in which braking is not performed. For example, when the braking force of the right braking device 25*b* is increased to be higher than the braking force of the left braking device 25*a* by controlling the left braking device 25*a* and the right braking device 25*b*, the propulsive force of the first wheel 7R1 becomes higher than the propulsive force of the second wheel 7R2, and a rotational difference is generated between the first wheel 7R1 and the second wheel 7R2. When the braking force of the left braking device 25*a* is increased to be higher than the braking force of the right braking device 25*b* by controlling the left braking device 25*a* and the right braking device 25*b*, the propulsive force of the second wheel 7R2 becomes higher than the propulsive force of the first wheel 7R1, and a rotational difference is generated between the first wheel 7R1 and the second wheel 7R2.

The rotational difference generating device 25 is not limited to having the aforementioned configuration. As long as the rotational difference generating device 25 is capable of causing a rotational difference between the first wheel 7R1 and the second wheel 7R2, the rotational difference generating device 25 is not limited to the braking device 25 and may be the transmission 5 that transmits an independent driving force to each of the first wheel 7R1 and the second wheel 7R2 by, for example, switching of a gear.

The second control unit 40a2 includes an electric/electronic circuit included in the controller 40, a program stored in a CPU or the like, and the like. Based on the planned traveling route L, the second control unit 40a2 sets braking of either the first wheel 7R1 or the second wheel 7R2 with respect to the braking device 25 by performing pumping control in which switching between the brake state and the release state is repeated.

At least when the machine body 3 is positioned in the turn section L2 under a situation in which the working machine 1 performs automated traveling, the second control unit 40a2 performs the pumping control and controls the braking device 25 such that the machine body 3 travels along the turn section L2. For example, when the machine body position W1 is positioned in the turn section L2 and when the turn section L2 is a right turn, the second control unit 40a2 regulates the propulsive force of the first wheel 7R1 to be higher than the propulsive force of the second wheel 7R2 by controlling the left braking device 25a and the right braking device 25b such that the machine body course F1 of the working machine 1 is in the right direction and the machine body 3 turns to the right. When the machine body position W1 is positioned in the turn section L2 and when the turn section L2 is a left turn, the second control unit 40a2 regulates the propulsive force of the second wheel 7R2 to be higher than the propulsive force of the first wheel 7R1 by controlling the left braking device 25a and the right braking device 25b such that the machine body course F1 of the working machine 1 is in the left direction and the machine body 3 turns to the left.

As illustrated in FIG. 4, the second control unit 40a2 sets braking of either the first wheel 7R1 or the second wheel 7R2 by performing the pumping control with respect to the braking device 25 based on the planned traveling route L (for example, the turn section L2). The second control unit 40a2 sets either a cycle at which the brake state and the release state are switched in the pumping control based on a table previously set or a duty ratio at which the brake state is performed in the cycle. In the present preferred embodiment, the second control unit 40a2 has a pumping setting unit 60 that sets the cycle and the duty ratio. The pumping setting unit 60 includes an electric/electronic circuit, a program stored in a CPU or the like, and the like. A pulse width t with which the brake state is performed with respect to the braking device 25 is calculated from the cycle and the duty ratio. The table is stored in the controller 40 or a storage unit (not illustrated) connected to the controller 40.

The braking device 25 can regulate the rotational difference between the first wheel 7R1 and the second wheel 7R2 by regulating the cycle and the duty ratio. In the following description, a cycle that is set by the pumping setting unit 60 based on a predetermined table is referred to as T, and the duty ratio is referred to as D. For example, when the cycle at which the brake state and the release state are switched in the pumping control is set to be long by the pumping setting unit 60, the brake state and the release state are repeated in a relatively long period, and it is thus possible to reliably transmit the braking of the first wheel 7R1 and the second wheel 7R2 to ground contact surfaces. When the cycle is set to be short by the pumping setting unit 60, the brake state and the release state are repeated in a relatively short period, and it is thus possible to suppress locking of the first wheel 7R1 and the second wheel 7R2.

When the duty ratio at which the brake state is performed in the cycle at which the brake state and the release state are switched in the pumping control is set to be high by the pumping setting unit 60, the percentage of the brake state in the pumping control becomes high, and it is thus possible to more reliably perform braking of the first wheel 7R1 and the second wheel 7R2 and possible to cause the rotational difference between the first wheel 7R1 and the second wheel 7R2 to be relatively large. When the duty ratio is set to be low by the pumping setting unit 60, the percentage of the brake state in the pumping control becomes low, and it is possible to cause the rotational difference between the first wheel 7R1 and the second wheel 7R2 to be relatively small.

The pumping setting unit 60 sets the cycle and the duty ratio based on a table that is previously set based on predetermined conditions. For example, the pumping setting unit 60 sets the cycle and the duty ratio based on the state of the transmission 5, the speed of the machine body 3, the type of the first wheel 7R1 and the second wheel 7R2, the steering angle of the steering device 11, and the like. Specifically, the pumping setting unit 60 sets the duty ratio to be different between the equal speed drive and the increased speed drive. In detail, the pumping setting unit 60 sets the duty ratio for the increased speed drive to be higher than the duty ratio for the equal speed drive. In more detail, the pumping setting unit 60 sets the duty ratio for the equal speed drive in accordance with the speed (machine body speed) of the machine body 3. The pumping setting unit 60 sets the duty ratio for the equal speed drive when the steering angle of the steering device 11 is more than or equal to a predetermined value. In other words, for the equal speed drive, the second control unit 40a2 performs the pumping control when the steering angle of the steering device 11 is more than or equal to a predetermined value and does not perform the pumping control when the steering angle of the steering device 11 is less than the predetermined value.

As illustrated in FIG. 2, the working machine 1 includes a state acquisition unit 40d that acquires the state of the transmission 5. The state acquisition unit 40d includes, for example, an electric/electronic circuit included in the controller 40, a program stored in a CPU or the like, and the like. The state acquisition unit 40d acquires information on operation of the switching tool 42j and acquires, based on the information, information on which one of the equal speed drive, the increased speed drive, and the 2WD the transmission 5 is switched to. Consequently, the pumping setting unit 60 determines whether the transmission 5 is switched to the increased speed drive or the equal speed drive based on the state of the transmission 5 acquired by the state acquisition unit 40d.

As illustrated in FIG. 2, the working machine 1 includes a speed acquisition unit 40c that acquires the machine body speed. The speed acquisition unit 40c includes, for example, an electric/electronic circuit included in the controller 40, a program stored in a CPU or the like, and the like. The speed acquisition unit 40c acquires information on the machine body 3 from a sensor included in the working machine 1 and acquires the machine body speed based on the information. For example, the speed acquisition unit 40c acquires the machine body speed by calculating the machine body speed based on the rotation speeds of the wheels 7F and 7R or acquires the machine body speed by calculating an actual machine body speed based on the machine body position W1 detected by the position detector 43 and the time of the detection. Consequently, the pumping setting unit 60 sets the duty ratio based on the machine body speed acquired by the speed acquisition unit 40c.

As illustrated in FIG. 2, the working machine 1 includes a steering-angle acquisition unit 40e that acquires the steering angle of the steering device 11. The steering-angle acquisition unit 40e includes, for example, an electric/ electronic circuit included in the controller 40, a program stored in a CPU or the like, and the like. The steering-angle acquisition unit 40e acquires the steering angle based on, for example, a signal acquired from the steering angle sensor 41e. The method of acquiring the steering angle is not limited to the aforementioned method. The steering-angle acquisition unit 40e may acquire the steering angle set by the first control unit 40a1 from the first control unit 40a1. Consequently, based on the steering angle acquired by the steering-angle acquisition unit 40e, the pumping setting unit 60 determines whether the steering angle is more than or equal to a predetermined steering angle. The steering angle is a value that is previously stored in the storage unit or the like and may be changeable optionally.

In the present preferred embodiment, the pumping setting unit 60 sets the duty ratio to satisfy the relation of D1>D2, where "D1" is the duty ratio for the increased speed drive and "D2" is the duty ratio for the equal speed drive. To set the duty ratio D2, the pumping setting unit 60 sets, based on the machine body speed acquired by the speed acquisition unit 40c, the duty ratio D2 in accordance with the machine body speed.

Specifically, when the transmission 5 is switched to the increased speed drive while the machine body position W1 is positioned in the turn section L2, the pumping setting unit 60 sets the duty ratio to D1. D1 is, for example, a predetermined value previously set and stored in the storage unit.

When the transmission 5 is switched to the equal speed drive and the steering angle is more than or equal to a predetermined steering angle while the machine body position W1 is positioned in the turn section L2, the pumping setting unit 60 sets the duty ratio to D2. The pumping setting unit 60 calculates D2 by, for example, subtracting (reference value d−correction value x) a correction value x that is in proportional to the machine body speed acquired by the speed acquisition unit 40c, from a reference value d (d<D1) previously set, and sets the D2 as the duty ratio.

The pumping setting unit 60 may set the cycle based on the state of the transmission 5, in addition to or instead of setting the duty ratio. The pumping setting unit 60 sets the cycle to be different between the equal speed drive and the increased speed drive. Specifically, the pumping setting unit 60 sets the cycle for the increased speed drive to be shorter than the cycle for the equal speed drive. The pumping setting unit 60 sets the cycle for the equal speed drive when the steering angle of the steering device 11 is more than or equal to a predetermined steering angle. In other words, for the equal speed drive, the second control unit 40a2 performs the pumping control when the steering angle of the steering device 11 is more than or equal to a predetermined steering angle and does not perform the pumping control when the steering angle of the steering device 11 is less than the predetermined steering angle.

In the present preferred embodiment, the pumping setting unit 60 sets the cycle to satisfy the relation of T1<T2, where "T1" is the cycle for the increased speed drive and "T2" is the cycle for the equal speed drive.

Specifically, when the transmission 5 is switched to the increased speed drive while the machine body position W1 is positioned in the turn section L2, the pumping setting unit 60 sets the cycle to T1. T1 is, for example, a predetermined value previously set and stored in the storage unit.

When the transmission 5 is switched to the equal speed drive and the steering angle is more than or equal to a predetermined steering angle while the machine body position W1 is positioned in the turn section L2, the pumping setting unit 60 sets the cycle T to T2. T2 is, for example, a predetermined value previously set and stored in the storage unit.

As illustrated in FIG. 5A, when the transmission 5 is switched to the increased speed drive and the steering angle is less than a predetermined value while the machine body position W1 is positioned in the turn section L2, the pumping setting unit 60 sets the cycle to T1 and sets the duty ratio to D1. The second control unit 40a2 controls the left braking device 25a and the right braking device 25b based on the cycle T1 and the duty ratio D1 that are set by the pumping setting unit 60. When the transmission 5 is switched to the increased speed drive and the steering angle is more than or equal to a predetermined value while the machine body position W1 is positioned in the turn section L2, the pumping setting unit 60 sets the cycle to T1 and sets the duty ratio to D1. The second control unit 40a2 controls the left braking device 25a and the right braking device 25b based on the cycle T1 and the duty ratio D1 that are set by the pumping setting unit 60.

As illustrated in FIG. 5A, when the transmission 5 is switched to the equal speed drive and the steering angle is less than a predetermined value while the machine body position W1 is positioned in the turn section L2, the pumping setting unit 60 does not set the cycle and the duty ratio, and the second control unit 40a2 controls the left braking device 25a and the right braking device 25b such that the propulsive force of the first wheel 7R1 and the propulsive force of the second wheel 7R2 are equal to each other. When the transmission 5 is switched to the equal speed drive and the steering angle is more than or equal to a predetermined value while the machine body position W1 is positioned in the turn section L2, the pumping setting unit 60 sets the cycle to T2 and sets the duty ratio to D2. In such a case, the pumping setting unit 60 calculates D2 by subtracting the correction value x from the reference value d and sets the D2 as the duty ratio. The second control unit 40a2 controls the left braking device 25a and the right braking device 25b based on the cycle T2 and the duty ratio D2 that are set by the pumping setting unit 60.

The pumping setting unit 60 may set the duty ratio based on the type of the first wheel 7R1 and the second wheel 7R2. The pumping setting unit 60 sets the duty ratio to be different between a case in which the first wheel 7R1 and the second wheel 7R2 are of a tire type and a case in which the first wheel 7R1 and the second wheel 7R2 are of a crawler type. Specifically, the pumping setting unit 60 sets the duty ratio for the case in which the first wheel 7R1 and the second wheel 7R2 are of the tire type to be higher than for a case in which the first wheel 7R1 and the second wheel 7R2 are of the crawler type.

The working machine 1 includes an input device to which information on whether the first wheel 7R1 and the second wheel 7R2 are of the tire type or the crawler type. Based on the information input in the input device, the pumping setting unit 60 determines whether the first wheel 7R1 and the second wheel 7R2 are of the tire type or the crawler type. The input device is a device that is connected to the controller 40 in a wired or wireless manner such that communication is enabled and outputs input information to the pumping setting unit 60 (controlling device 40). In the present preferred embodiment, the input device is the display device 50. By operating the display unit 51, it is possible to input information on whether the first wheel 7R1 and the second wheel 7R2 are of the tire type or the crawler type. As long as the pumping setting unit 60 can acquire information on whether the first wheel 7R1 and the second wheel 7R2 are of the tire type or the crawler type, the method thereof is not limited to the aforementioned method. As the input device, an existing technology can be used. The input device may be an operation switch disposed around the operator's seat 10. Consequently, the pumping setting unit 60 determines whether the first wheel 7R1 and the second wheel 7R2 are of the tire type or the crawler type.

In the present preferred embodiment, the pumping setting unit 60 sets the duty ratio to satisfy the relation of D3<D4, where "D3" is the duty ratio for the case in which the first wheel 7R1 and the second wheel 7R2 are of the crawler type, and "D4" is the duty ratio for the case in which the first wheel 7R1 and the second wheel 7R2 are of the tire type.

Specifically, when the first wheel 7R1 and the second wheel 7R2 are of the crawler type while the machine body position W1 is positioned in the turn section L2, the pumping setting unit 60 sets the duty ratio to D3.

When the first wheel 7R1 and the second wheel 7R2 are of the tire type while the machine body position W1 is positioned in the turn section L2, the pumping setting unit 60 sets the duty ratio to D4.

Figure 5B:
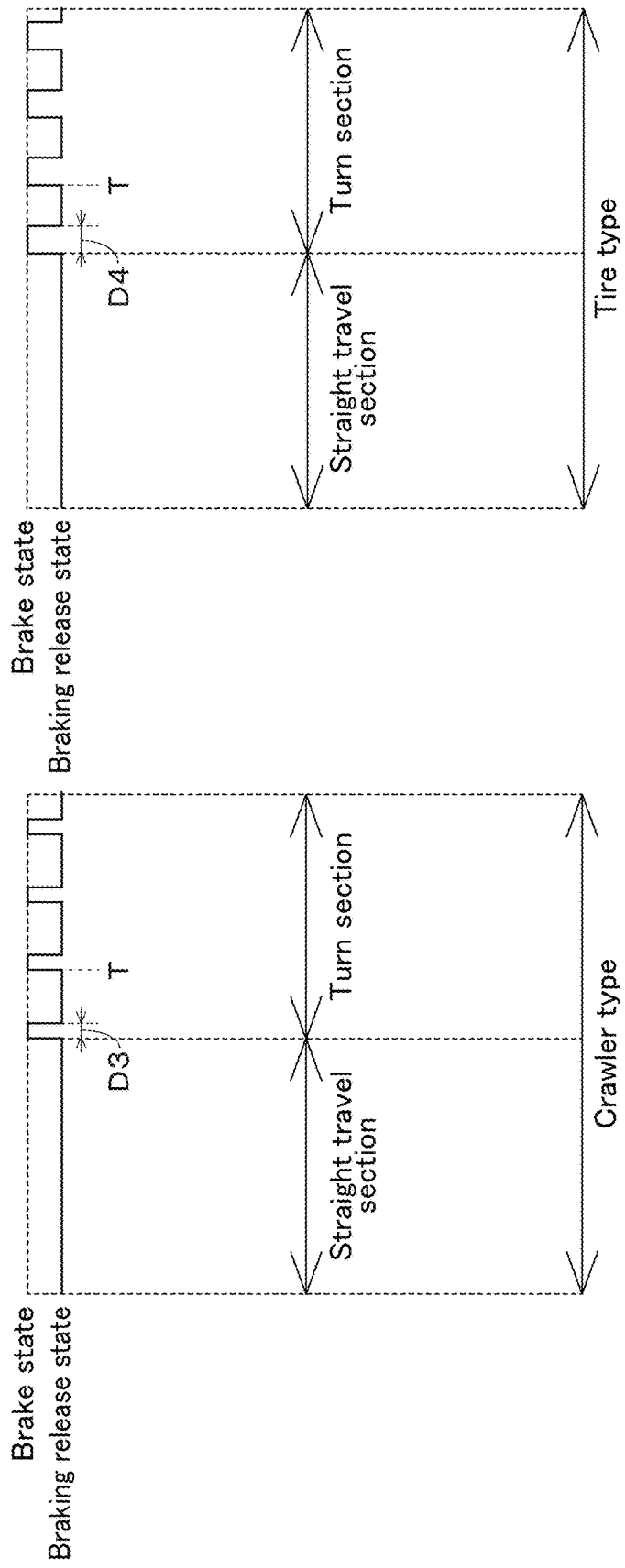
FIG. 5B is a second diagram describing setting of the cycle and the duty ratio by the pumping setting unit.

As illustrated in FIG. 5B, when the first wheel 7R1 and the second wheel 7R2 are of the crawler type while the machine body position W1 is positioned in the straight travel section L1, the pumping setting unit 60 does not set the cycle and the duty ratio, and the second control unit 40a2 controls the left braking device 25a and the right braking device 25b such that the propulsive force of the first wheel 7R1 and the propulsive force of the second wheel 7R2 are equal to each other. When the first wheel 7R1 and the second wheel 7R2 are of the crawler type while the machine body position W1 is positioned in the turn section L2, the pumping setting unit 60 sets the cycle to T and sets the duty ratio to D3. Based on the cycle T and the duty ratio D3 that are set by the pumping setting unit 60, the second control unit 40a2 controls the left braking device 25a and the right braking device 25b.

As illustrated in FIG. 5B, when the first wheel 7R1 and the second wheel 7R2 are of the tire type while the machine body position W1 is positioned in the straight travel section L1, the pumping setting unit 60 does not set the cycle and the duty ratio, and the second control unit 40a2 controls the left braking device 25a and the right braking device 25b such that the propulsive force of the first wheel 7R1 and the propulsive force of the second wheel 7R2 are equal to each other. When the first wheel 7R1 and the second wheel 7R2 are of the tire type while the machine body position W1 is positioned in the turn section L2, the pumping setting unit 60 sets the cycle to T and sets the duty ratio to D4. Based on the cycle T and the duty ratio D4 that are set by the pumping setting unit 60, the second control unit 40a2 controls the left braking device 25a and the right braking device 25b.

In the preferred embodiment described above, the second control unit 40a2 performs the pumping control when the machine body 3 is positioned in the turn section L2 and controls the braking device 25 such that the machine body 3 travels along the turn section L2. However, the second control unit 40a2 may perform the pumping control when the machine body 3 is positioned in the straight travel section L1 and control such that the machine body 3 travels along the planned traveling route L. Hereinafter, the pumping control by the second control unit 40a2 when the machine body position W1 is positioned in the straight travel section L1 will be described. Specifically, when the deviation between the machine body 3 and the planned traveling route L is less than a predetermined deviation previously set, the second control unit 40a2 controls the braking device 25 and regulates the propulsive forces such that the rotational difference between the first wheel 7R1 and the second wheel 7R2 is zero and the machine body 3 travels straight. When the deviation between the machine body 3 and the planned traveling route L is more than or equal to the predetermined deviation, the second control unit 40a2 causes a rotational difference between the first wheel 7R1 and the second wheel 7R2 such that the deviation is zero, and changes the machine body course F1.

When the deviation (position deviation) between the machine body position W1 and the planned traveling route L is less than a first threshold previously set, the second control unit 40a2 controls the left braking device 25a and the right braking device 25b such that the propulsive force of the first wheel 7R1 and the propulsive force of the second wheel 7R2 are equal to each other. Consequently, the rotational difference between the first wheel 7R1 and the second wheel 7R2 becomes zero, and the propulsive force of the machine body 3 is regulated such that the machine body 3 travels straight. The first threshold is, for example, a value larger than the first set value (first threshold>first set value). At least when the first control unit 40a1 rotates the rotary shaft 11b such that the steering direction of the working machine 1 is directed to the planned traveling route L, the second control unit 40a2 controls the left braking device 25a and the right braking device 25b such that the propulsive force of the first wheel 7R1 and the propulsive force of the second wheel 7R2 are equal to each other. The relation of the first threshold to the first set value is not limited to the aforementioned relation. The first threshold may be, for example, a value smaller than the first set value and may be a value equal to the first set value.

When the position deviation between the machine body position W1 and the planned traveling route L is more than or equal to the first threshold and when the working machine 1 is positioned on the left side of the planned traveling route L, the second control unit 40a2 controls the left braking device 25a and the right braking device 25b and regulates the propulsive force of the first wheel 7R1 to be higher than the propulsive force of the second wheel 7R2 such that the machine body course F1 of the working machine 1 is in the right direction.

When the position deviation between the machine body position W1 and the planned traveling route L is more than or equal to the first threshold and when the working machine 1 is positioned on the right side of the planned traveling route L, the second control unit 40a2 controls the left braking device 25a and the right braking device 25b and regulates the propulsive force of the second wheel 7R2 to be higher than the propulsive force of the first wheel 7R1 such that the machine body course F1 of the working machine 1 is in the left direction.

In the preferred embodiment described above, the second control unit 40a2 controls the left braking device 25a and the right braking device 25b based on the position deviation between the machine body position W1 and the planned traveling route L. However, when the course of the planned traveling route L and the course (machine body course) F1 of the running direction (traveling direction) of the working machine 1 (machine body 3) differ from each other, in other words, when the angle (course deviation) θg of the machine body course F1 with respect to the planned traveling route L is more than or equal to a third threshold, the second control unit 40a2 may control the left braking device 25a and the right braking device 25b such that the angle θg is zero (the machine body course F1 coincides with the course of the planned traveling route L). In such a case, the third threshold is, for example, a value larger than the second set value (third threshold>second set value). At least when the first control unit 40a1 rotates the rotary shaft 11b such that the steering direction of the working machine 1 is directed to the planned traveling route L, the second control unit 40a2 controls the left braking device 25a and the right braking device 25b such that the propulsive force of the first wheel 7R1 and the propulsive force of the second wheel 7R2 are equal to each other. The relation of the third threshold to the second set value is not limited to the aforementioned relation. The third threshold may be, for example, a value smaller than the second set value and may be a value equal to the second set value. In addition, the method of the control by the second control unit 40a2 is not limited to the aforementioned method. The second control unit 40a2 may control the left braking device 25a and the right braking device 25b based on both the deviation (position deviation) and the angle (course deviation) θg.

In the preferred embodiment described above, the pumping setting unit 60 sets the cycle and the duty ratio based on a table previously set based on a predetermined condition. However, the pumping setting unit 60 may be capable of correcting and setting the cycle and/or the duty ratio based on different conditions in addition to or instead of the aforementioned conditions. For example, the pumping setting unit 60 sets the cycle and the duty ratio based on the straight travel section L1 and the turn section L2 of the planned traveling route L, the positional deviation between the position of the machine body 3 and the planned traveling route L, the course deviation θg of the machine body 3 with respect to the planned traveling route L, and the like, and the second control unit 40a2 performs the pumping control based on the cycle and the duty ratio that are set by the pumping setting unit 60. Hereinafter, an example in which the second control unit 40a2 performs the pumping control both when the machine body position W1 is positioned in the straight travel section L1 and when the machine body position W1 is positioned in the turn section L2 will be described.

First, a case in which the pumping setting unit 60 sets the cycle and the duty ratio based on the straight travel section L1 and the turn section L2 of the planned traveling route L will be described. When the machine body 3 is positioned in the straight travel section L1, the pumping setting unit 60 sets the cycle to be longer and/or sets the duty ratio to be lower than when the machine body 3 is positioned in the turn section L2. Consequently, the frequency of braking by the braking device 25 in the straight travel section L1 is reduced, and it is thus possible to reduce or prevent damage of an agricultural field H.

In the present preferred embodiment, the pumping setting unit 60 determines in which one of the straight travel section L1 and the turn section L2 the machine body 3 is positioned based on the planned traveling route L and the machine body position W1 detected by the position detector 43. When the machine body 3 is positioned in the straight travel section L1 while the positional deviation between the machine body position W1 and the planned traveling route L is more than or equal to the first threshold, the pumping setting unit 60 corrects and sets the cycle to be longer and corrects and sets the duty ratio to be lower than when the machine body 3 is positioned in the turn section L2.

Specifically, when the machine body 3 is positioned in the straight travel section L1, the pumping setting unit 60 corrects the cycle to be longer by multiplying the cycle T that is set based on the table by a predetermined correction value α1 (for example, about 110% to about 150%). When the machine body 3 is positioned in the straight travel section L1, the pumping setting unit 60 corrects the duty ratio to be lower by multiplying the duty ratio D that is set based on the table by a predetermined correction value β1 (for example, about 60% to about 80%).

As illustrated in FIG. 6A, when the machine body 3 is positioned in the straight travel section L1 and when the position deviation between the machine body position W1 and the planned traveling route L is less than the first threshold previously set, the pumping setting unit 60 does not set the cycle and the duty ratio, and the second control unit 40a2 controls the left braking device 25a and the right braking device 25b such that the propulsive force of the first wheel 7R1 and the propulsive force of the second wheel 7R2 are equal to each other. When the machine body 3 is positioned in the straight travel section L1 and when the position deviation between the machine body position W1 and the planned traveling route L is more than or equal to the first threshold, the pumping setting unit 60 corrects and sets the cycle by multiplying T by the correction value α1 and corrects and sets the duty ratio by multiplying D by the predetermined correction value β1. Based on the cycle and the duty ratio corrected and set by the pumping setting unit 60, the second control unit 40a2 controls the left braking device 25a and the right braking device 25b.

As illustrated in FIG. 6A, when the machine body 3 is positioned in the turn section L2 and when the position deviation between the machine body position W1 and the planned traveling route L is less than the first threshold previously set, the pumping setting unit 60 does not set the cycle and the duty ratio, and the second control unit 40a2 controls the left braking device 25a and the right braking device 25b such that the propulsive force of the first wheel 7R1 and the propulsive force of the second wheel 7R2 are equal to each other. When the machine body 3 is positioned in the turn section L2 and when the position deviation between the machine body position W1 and the planned traveling route L is more than or equal to the first threshold, the pumping setting unit 60 sets the cycle to T and sets the duty ratio to D. Based on the cycle and the duty ratio set by the pumping setting unit 60, the second control unit 40a2 controls the left braking device 25a and the right braking device 25b.

As long as the pumping setting unit 60 sets the cycle to be longer and sets the duty ratio to be lower when the machine body 3 is positioned in the straight travel section L1 than when the machine body 3 is positioned in the turn section L2, the method thereof is not limited to the aforementioned method. The pumping setting unit 60 may set the cycle to T and set the duty ratio to D based on the table when the machine body 3 is positioned in the straight travel section L1 and may correct and set the cycle T and/or the duty ratio D when the machine body 3 is positioned in the turn section L2.

Next, a case in which the pumping setting unit 60 corrects and sets the cycle and the duty ratio based on the position deviation will be described. When the position deviation is more than or equal to a second threshold larger than the first threshold, the pumping setting unit 60 sets the cycle to be shorter and/or sets the duty ratio to be higher than when the position deviation is more than or equal to the first threshold and less than the second threshold. Consequently, when the position deviation exceeds the first threshold and is more than or equal to the second threshold, the frequency of braking by the braking device 25 is increased compared with when the position deviation is more than or equal to the first threshold and less than the second threshold. It is thus possible to achieve both maintaining of the state of the agricultural field H and quick steering.

In the present preferred embodiment, the pumping setting unit 60 determines whether the position deviation is more than or equal to the second threshold based on the planned traveling route L and the machine body position W1 detected by the position detector 43. When the position deviation is more than or equal to the second threshold, the pumping setting unit 60 corrects and sets the cycle to be shorter and corrects and sets the duty ratio to be higher than when the position deviation is more than or equal to the first threshold and less than the second threshold. Specifically, when the position deviation is more than or equal to the second threshold, the pumping setting unit 60 corrects the cycle to be shorter by multiplying the cycle T set based on the table by a predetermined correction value $\alpha 2$ (for example, about 60% to about 80%). When the position deviation is more than or equal to the second threshold, the pumping setting unit 60 corrects the duty ratio to be higher by multiplying the duty ratio D set based on the table by a predetermined correction value $\beta 2$ (for example, about 110% to about 150%).

Figure 6B:
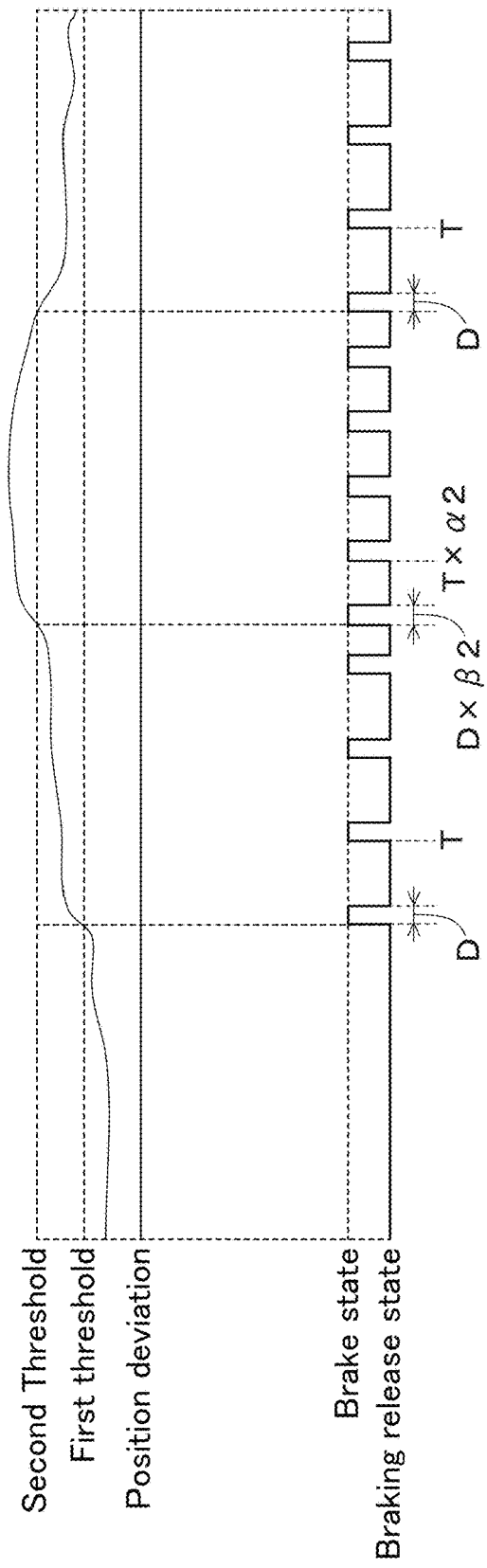
FIG. 6B is a fourth diagram describing setting of the cycle and the duty ratio by the pumping setting unit.

As illustrated in FIG. 6B, when the position deviation between the machine body position W1 and the planned traveling route L is less than the first threshold, the pumping setting unit 60 does not set the cycle and the duty ratio, and the second control unit 40*a*2 controls the left braking device 25*a* and the right braking device 25*b* such that the propulsive force of the first wheel 7R1 and the propulsive force of the second wheel 7R2 are equal to each other.

When the position deviation between the machine body position W1 and the planned traveling route L is more than or equal to the first threshold and less than the second threshold, the pumping setting unit 60 sets the cycle to T and sets the duty ratio to D. Based on the cycle and the duty ratio set by the pumping setting unit 60, the second control unit 40*a*2 controls the left braking device 25*a* and the right braking device 25*b*.

As illustrated in FIG. 6B, when the position deviation between the machine body position W1 and the planned traveling route L is more than or equal to the second threshold, the cycle is corrected and set by multiplying T by the correction value $\alpha 2$, and the duty ratio is corrected and set by multiplying D by the predetermined correction value $\beta 2$. Based on the cycle and the duty ratio corrected and set by the pumping setting unit 60, the second control unit 40*a*2 controls the left braking device 25*a* and the right braking device 25*b*.

Next, a case in which the pumping setting unit 60 corrects and sets the cycle and the duty ratio based on the course deviation $\theta g$ will be described. In such a case, the second control unit 40*a*2 controls the left braking device 25*a* and the right braking device 25*b* at least such that the course deviation $\theta g$ is zero (the machine body course F1 coincides with the course of the planned traveling route L). When the course deviation $\theta g$ is more than or equal to a fourth threshold larger than the third threshold, the pumping setting unit 60 sets the cycle to be shorter and/or sets the duty ratio to be higher than when the course deviation $\theta g$ is more than or equal to the third threshold and less than the fourth threshold. Consequently, when the course deviation $\theta g$ exceeds the third threshold and is more than or equal to the fourth threshold, the frequency of braking by the braking device 25 is increased compared with when the course deviation $\theta g$ is more than or equal to the third threshold and less than the fourth threshold. It is thus possible to achieve both maintaining of the state of the agricultural field H and quick steering.

In the present preferred embodiment, the pumping setting unit 60 determines whether the course deviation $\theta g$ is more than or equal to the fourth threshold based on the planned traveling route L and the machine body course F1 detected by the position detector 43. When the course deviation $\theta g$ is more than or equal to the fourth threshold, the pumping setting unit 60 corrects and sets the cycle to be shorter and corrects and sets the duty ratio to be higher than when the course deviation $\theta g$ is more than or equal to the third threshold and less than the fourth threshold. Specifically, when the course deviation $\theta g$ is more than or equal to the fourth threshold, the pumping setting unit 60 corrects the cycle to be shorter by multiplying the cycle T set based on the table by a predetermined correction value $\alpha 3$ (for example, about 60% to about 80%). When the course deviation $\theta g$ is more than or equal to the fourth threshold, the pumping setting unit 60 corrects the duty ratio to be higher by multiplying the duty ratio D set based on the table by a predetermined correction value $\beta$ (for example, about 110% to about 150%).

Figure 6C:
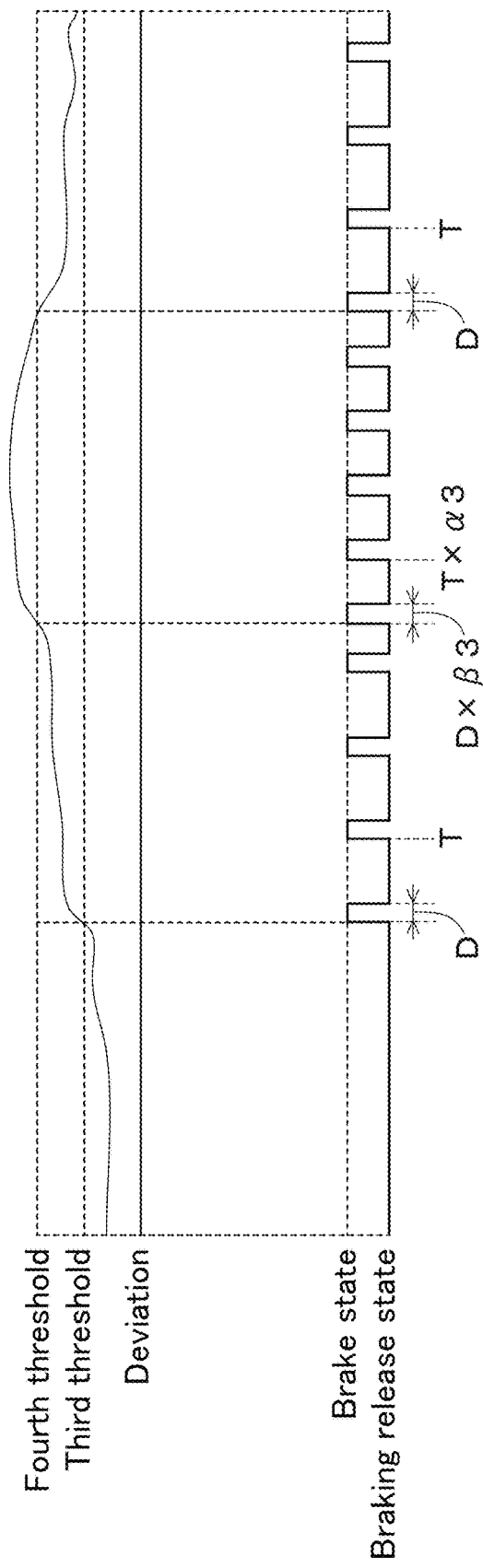
FIG. 6C is a fifth diagram describing setting of the cycle and the duty ratio by the pumping setting unit.

As illustrated in FIG. 6C, when the course deviation $\theta g$ between the machine body position W1 and the planned traveling route L is less than the third threshold, the pumping setting unit 60 does not set the cycle and the duty ratio, and the second control unit 40*a*2 controls the left braking device 25*a* and the right braking device 25*b* such that the propulsive force of the first wheel 7R1 and the propulsive force of the second wheel 7R2 are equal to each other.

When the course deviation $\theta g$ between the machine body position W1 and the planned traveling route L is more than or equal to the third threshold and less than the fourth threshold, the pumping setting unit 60 sets the cycle to T and sets the duty ratio to D. Based on the cycle and the duty ratio set by the pumping setting unit 60, the second control unit 40*a*2 controls the left braking device 25*a* and the right braking device 25*b*.

As illustrated in FIG. 6C, when the course deviation $\theta g$ between the machine body position W1 and the planned traveling route L is more than or equal to the fourth threshold, the cycle is corrected and set by multiplying T by the correction value $\alpha 3$, and the duty ratio is corrected and set by multiplying D by the predetermined correction value $\beta 3$. Based on the cycle and the duty ratio corrected and set by the pumping setting unit 60, the second control unit 40*a*2 controls the left braking device 25*a* and the right braking device 25*b*.

Next, a case in which the pumping setting unit 60 corrects and sets the cycle and the duty ratio based on a slip ratio will be described. In such a case, the working machine 1 includes a slip-ratio acquisition unit 40*b* that acquires the slip ratio of the machine body 3. The slip-ratio acquisition unit 40*b* includes, for example, an electric/electronic circuit included in the controller 40, a program stored in a CPU or the like, and the like. The slip-ratio acquisition unit 40*b* acquires the slip ratio by calculating the slip ratio based on the rotation speeds of the wheels 7F and 7R and an actually measured machine body speed (hereinafter referred to as the actual machine body speed). Specifically, the slip-ratio acquisition unit 40*b* calculates the slip ratio based on a quotient of a difference between the actual machine body speed and the rotation speed, and the actual machine body speed. For example, the slip-ratio acquisition unit 40*b* acquires the rotation speed of the rear wheel 7R from the rotation speed of the rear axle 21R detected by the rotation speed sensor 41*h*, and the like. The slip-ratio acquisition unit 40*b* acquires the actual machine body speed based on the machine body position W1 detected by the position detector 43 and the time of the detection. As long as the slip-ratio acquisition unit can acquire the slip ratio, the calculation method and the acquisition method thereof are not limited to the aforementioned methods.

When the slip ratio acquired by the slip-ratio acquisition unit 40*b* is less than or equal to a fifth threshold (fifth threshold<0) lower than zero, the pumping setting unit 60 sets the cycle to be shorter and/or sets the duty ratio to be higher than when the slip ratio exceeds the fifth threshold. Consequently, the frequency of braking by the braking device 25 when the slip ratio is lower than zero, in other words, when the first wheel 7R1 and the second wheel 7R2 slip with respect to the agricultural field H is set to be increased. It is thus possible to reduce or prevent slipping of the first wheel 7R1 and the second wheel 7R2.

When the slip ratio acquired by the slip-ratio acquisition unit 40*b* is more than or equal to a sixth threshold (sixth threshold>0) higher than zero, the pumping setting unit 60 sets the cycle to be longer and/or sets the duty ratio to be lower than when the slip ratio is less than the sixth threshold. Consequently, the frequency of braking by the braking device 25 when the slip ratio is higher than zero, in other words, when the moving speed of the machine body 3 is faster than the rotation speeds of the first wheel 7R1 and the second wheel 7R2 and when the machine body 3 slips is set to be reduced. It is thus possible to reduce or prevent locking of the first wheel 7R1 and the second wheel 7R2.

In the present preferred embodiment, when the slip ratio is less than or equal to the fifth threshold while the position deviation between the machine body position W1 and the planned traveling route L is more than or equal to the first threshold, the pumping setting unit 60 corrects and sets the cycle to be shorter and corrects and sets the duty ratio to be higher than when the slip ratio exceeds the fifth threshold and is less than the sixth threshold. Specifically, when the slip ratio is less than or equal to the fifth threshold, the pumping setting unit 60 corrects the cycle to be shorter by multiplying the cycle T set based on the table by a predetermined correction value $\alpha 4$ (for example, about 60% to about 80%). When the slip ratio is less than or equal to the fifth threshold, the pumping setting unit 60 corrects the duty ratio to be higher by multiplying the duty ratio D set based on the table by a predetermined correction value $\beta 4$ (for example, about 110% to about 150%).

When the slip ratio is more than or equal to the sixth threshold while the position deviation between the machine body position W1 and the planned traveling route L is more than or equal to the first threshold, the pumping setting unit 60 corrects and sets the cycle to be longer and sets the duty ratio to be lower than when the slip ratio exceeds the fifth threshold and is less than the sixth threshold. Specifically, when the slip ratio is more than or equal to the sixth threshold, the pumping setting unit 60 corrects the cycle to be longer by multiplying the cycle T set based on the table by a predetermined correction value $\alpha 5$ (for example, about 110% to about 150%). When the slip ratio is less than or equal to the fifth threshold, the pumping setting unit 60 corrects the duty ratio by multiplying the duty ratio D set based on the table by a predetermined correction value $\beta 5$ (for example, about 60% to about 80%).

Figure 6D:
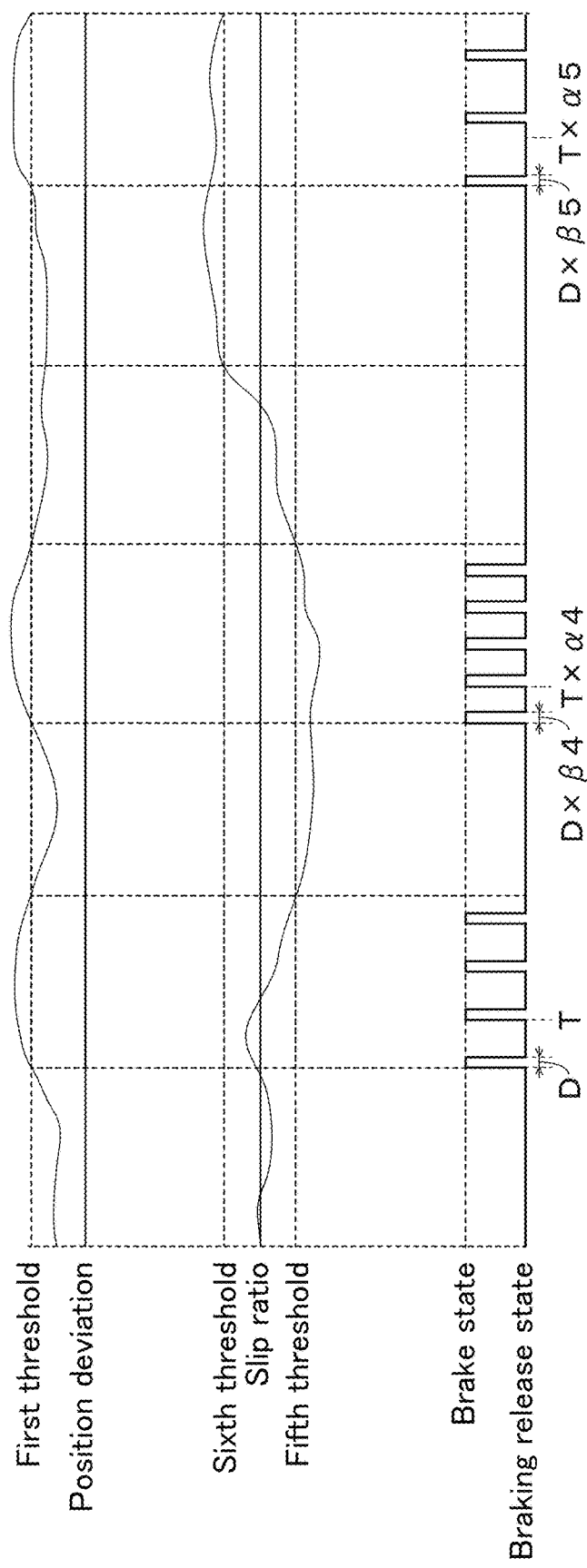
FIG. 6D is a sixth diagram describing setting of the cycle and the duty ratio by the pumping setting unit.

As illustrated in FIG. 6D, when the slip ratio is less than or equal to the fifth threshold and when the position deviation between the machine body position W1 and the planned traveling route L is less than the first threshold previously set, the pumping setting unit 60 does not set the cycle and the duty ratio, and the second control unit 40*a*2 controls the left braking device 25*a* and the right braking device 25*b* such that the propulsive force of the first wheel 7R1 and the propulsive force of the second wheel 7R2 are equal to each other. When the slip ratio is less than or equal to the fifth threshold and when the position deviation between the machine body position W1 and the planned traveling route L is more than or equal to the first threshold, the pumping setting unit 60 corrects and sets the cycle by multiplying T by the correction value $\alpha 4$ and corrects and sets the duty ratio by multiplying D by the predetermined correction value $\beta 4$. Based on the cycle and the duty ratio corrected and set by the pumping setting unit 60, the second control unit 40*a*2 controls the left braking device 25*a* and the right braking device 25*b*.

As illustrated in FIG. 6D, when the slip ratio exceeds the fifth threshold and is less than the sixth threshold and when the position deviation between the machine body position W1 and the planned traveling route L is less than the first threshold previously set, the pumping setting unit 60 does not set the cycle and the duty ratio, and the second control unit 40*a*2 controls the left braking device 25*a* and the right braking device 25*b* such that the propulsive force of the first wheel 7R1 and the propulsive force of the second wheel 7R2 are equal to each other. When the slip ratio exceeds the fifth threshold and is less than the sixth threshold and when the position deviation between the machine body position W1 and the planned traveling route L is more than or equal to the first threshold, the pumping setting unit 60 sets the cycle to T and sets the duty ratio to D. Based on the cycle and the duty ratio set by the pumping setting unit 60, the second control unit 40*a*2 controls the left braking device 25*a* and the right braking device 25*b*.

As illustrated in FIG. 6D, when the slip ratio is more than or equal to the sixth threshold and when the position deviation between the machine body position W1 and the planned traveling route L is less than the first threshold previously set, the pumping setting unit 60 does not set the cycle and the duty ratio, and the second control unit 40*a*2 controls the left braking device 25*a* and the right braking device 25*b* such that the propulsive force of the first wheel 7R1 and the propulsive force of the second wheel 7R2 are equal to each other. When the slip ratio is more than or equal to the sixth threshold and when the position deviation between the machine body position W1 and the planned traveling route L is more than or equal to the first threshold, the pumping setting unit 60 corrects and sets the cycle by multiplying T by the correction value $\alpha 5$ and corrects and sets the duty ratio by multiplying D by the predetermined correction value $\beta 5$. Based on the cycle and the duty ratio corrected and set by the pumping setting unit 60, the second control unit 40*a*2 controls the left braking device 25*a* and the right braking device 25*b*.

Next, a case in which the pumping setting unit 60 corrects and sets the cycle and the duty ratio based on regions of the agricultural field H will be described. When the machine body position W1 detected by the position detector 43 is positioned in a predetermined region of the agricultural field H, the pumping setting unit 60 sets the cycle to be shorter and/or sets the duty ratio to be higher than when the machine body position W1 is positioned in a region other than the predetermined region.

In the present preferred embodiment, the pumping setting unit 60 determines whether the machine body position W1 is positioned in the predetermined region based on an agricultural field map M previously set and the machine body position W1 detected by the position detector 43. The agricultural field map M is a map that includes positional information and the like on the agricultural field H in which the working machine 1 performs work. The agricultural field map M is set by using a computer, such as a personal computer (PC) connected to the working machine 1 such that communication is enabled, a smartphone (multifunctional mobile telephone), or a tablet. The agricultural field map M includes positional information on divisions for each agricultural field H and a region of an obstacle and the like in the agricultural field H and corresponds to the planned traveling route L. For example, as illustrated in FIG. 3B, the agricultural field map M includes positional information on a region (hereinafter referred to as the first region) E1 of the agricultural field H including furrows and the periphery of the furrows and a region (hereinafter referred to as the second region) E2 of the agricultural field H other than the first region. When the machine body position W1 detected by the position detector 43 is positioned in the first region E1, the pumping setting unit 60 sets the cycle to be shorter and/or sets the duty ratio to be higher than when the machine body position W1 is positioned in the second region E2. Consequently, the frequency of braking by the braking device 25 is set to be increased for regions such as furrows in the agricultural field H in which the machine body 3 turns frequently while roughness of the regions is relatively allowable, and quicker steering is enabled.

In the present preferred embodiment, when the machine body 3 is positioned in the first region E1 while the position deviation between the machine body position W1 and the planned traveling route L is more than or equal to the first threshold, the pumping setting unit 60 corrects and sets the cycle to be shorter and corrects and sets the duty ratio to be higher than when the machine body 3 is positioned in the second region E2. Specifically, when the machine body 3 is positioned in the first region E1, the pumping setting unit 60 corrects the cycle to be shorter by multiplying the cycle T set based on the table by a predetermined correction value $\alpha 6$ (for example, about 60% to about 80%). When the machine body 3 is positioned in the first region E1, the pumping setting unit 60 corrects the duty ratio to be higher by multiplying the duty ratio D set based on the table by a predetermined correction value $\beta 6$ (for example, about 110% to about 150%).

As illustrated in FIG. 6E, when the machine body 3 is positioned in the first region E1 and when the position deviation between the machine body position W1 and the planned traveling route L is less than the first threshold previously set, the pumping setting unit 60 does not set the cycle and the duty ratio, and the second control unit 40a2 controls the left braking device 25a and the right braking device 25b such that the propulsive force of the first wheel 7R1 and the propulsive force of the second wheel 7R2 are equal to each other. When the machine body 3 is positioned in the first region E1 and when the position deviation between the machine body position W1 and the planned traveling route L is more than or equal to the first threshold, the pumping setting unit 60 corrects and sets the cycle by multiplying T by the correction value $\alpha 6$ and corrects and sets the duty ratio by multiplying D by the predetermined correction value $\beta 6$. Based on the cycle and the duty ratio corrected and set by the pumping setting unit 60, the second control unit 40a2 controls the left braking device 25a and the right braking device 25b.

As illustrated in FIG. 6E, when the machine body 3 is positioned in the second region E2 and when the position deviation between the machine body position W1 and the planned traveling route L is less than the first threshold previously set, the pumping setting unit 60 does not set the cycle and the duty ratio, and the second control unit 40a2 controls the left braking device 25a and the right braking device 25b such that the propulsive force of the first wheel 7R1 and the propulsive force of the second wheel 7R2 are equal to each other. When the machine body 3 is positioned in the second region E2 and when the position deviation between the machine body position W1 and the planned traveling route L is more than or equal to the first threshold, the pumping setting unit 60 sets the cycle to T and sets the duty ratio to D. Based on the cycle and the duty ratio set by the pumping setting unit 60, the second control unit 40a2 controls the left braking device 25a and the right braking device 25b.

As long as the pumping setting unit 60 sets the cycle to be shorter and sets the duty ratio to be higher when the machine body 3 is positioned in the first region E1 than when the machine body 3 is positioned in the second region E2, the method thereof is not limited to the aforementioned method. The pumping setting unit 60 may set the cycle to T and set the duty ratio to D based on the table when the machine body 3 is positioned in the first region E1 and may correct and set the cycle T and/or the duty ratio D when the machine body 3 is positioned in the second region E2.

Next, a case in which the pumping setting unit 60 corrects and sets the cycle and the duty ratio based on vehicle speed will be described. When the speed (machine body speed) of the machine body 3 is more than or equal to a predetermined speed, the pumping setting unit 60 sets the cycle to be longer and/or sets the duty ratio to be lower. Consequently, the frequency of braking by the braking device 25 is set to be reduced when the speed of the machine body 3 is fast, in other words, when the rotation speeds of the first wheel 7R1 and the second wheel 7R2 are fast. Thus, the change amount of the rotation speeds of the first wheel 7R1 and the second wheel 7R2 per hour decreases, and maintaining of the state of the agricultural field H and quick steering are both achieved.

In the present preferred embodiment, when the machine body speed is more than or equal to a predetermined machine body speed (for example, about 5 km/h, about 10 km/h, or the like) while the position deviation between the machine body position W1 and the planned traveling route L is more than or equal to the first threshold, the pumping setting unit 60 corrects and sets the cycle to be longer and corrects and sets the duty ratio to be lower than when the machine body speed is less than the predetermined machine body speed. Specifically, when the machine body speed is more than or equal to a predetermined machine body speed, the pumping setting unit 60 corrects the cycle to be longer by multiplying the cycle T set based on the table by a predetermined correction value $\alpha 7$ (for example, about 110% to about 150%). When the machine body speed is more than or equal to the predetermined machine body speed, the pumping setting unit 60 corrects the duty ratio to be lower by multiplying the duty ratio D set based on the table by a predetermined correction value $\beta 7$ (for example, about 60% to about 80%).

Figure 6F:
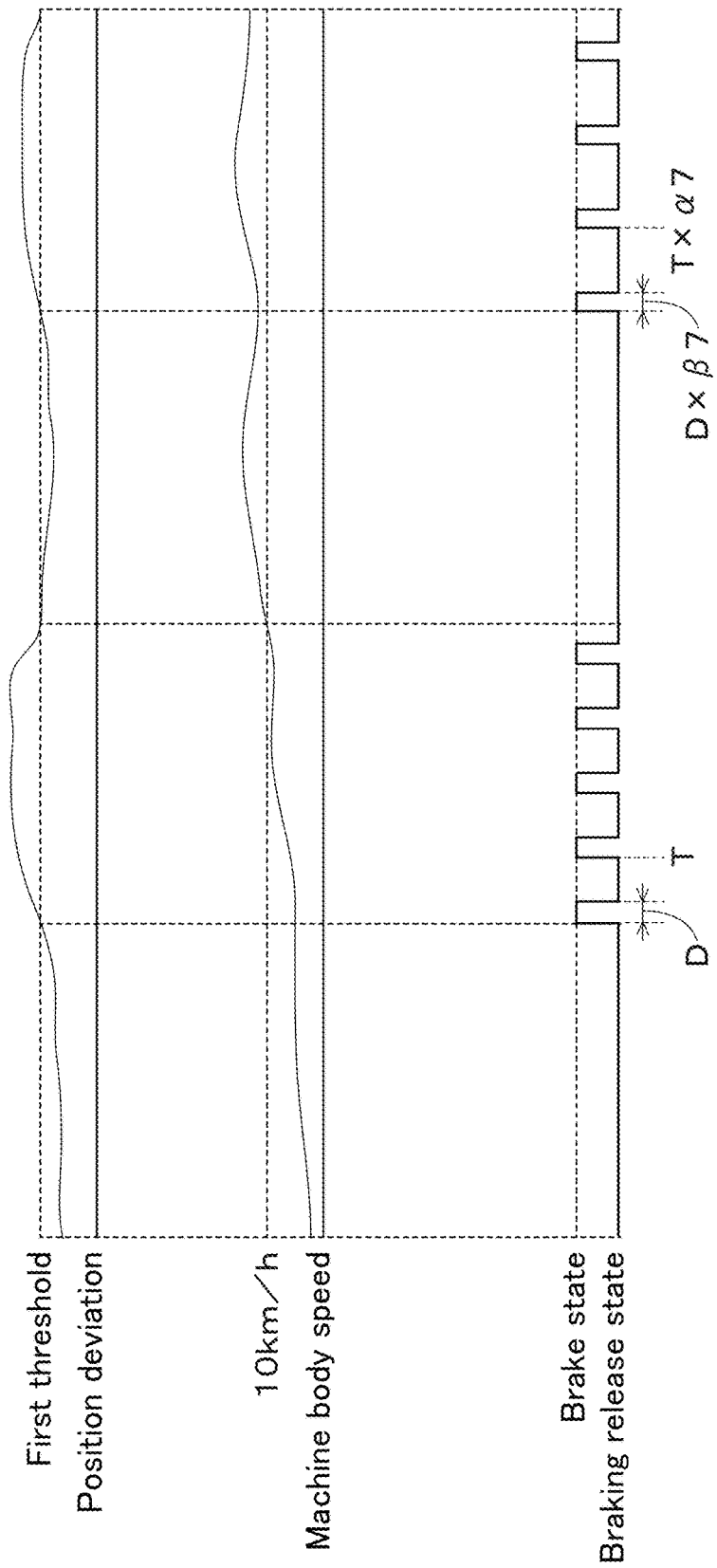
FIG. 6F is an eighth diagram describing setting of the cycle and the duty ratio by the pumping setting unit.

As illustrated in FIG. 6F, when the machine body speed is less than a predetermined machine body speed and when the position deviation between the machine body position W1 and the planned traveling route L is less than the first threshold previously set, the pumping setting unit 60 does not set the cycle and the duty ratio, and the second control unit 40a2 controls the left braking device 25a and the right braking device 25b such that the propulsive force of the first wheel 7R1 and the propulsive force of the second wheel 7R2 are equal to each other. When the machine body speed is less than a predetermined machine body speed and when the position deviation between the machine body position W1 and the planned traveling route L is more than or equal to the first threshold, the pumping setting unit 60 sets the cycle to T and sets the duty ratio to D. Based on the cycle and the duty ratio set by the pumping setting unit 60, the second control unit 40a2 controls the left braking device 25a and the right braking device 25b.

As illustrated in FIG. 6F, when the machine body speed is more than or equal to a predetermined machine body speed and when the position deviation between the machine body position W1 and the planned traveling route L is less than the first threshold previously set, the pumping setting unit 60 does not set the cycle and the duty ratio, and the second control unit 40a2 controls the left braking device 25a and the right braking device 25b such that the propulsive force of the first wheel 7R1 and the propulsive force of the second wheel 7R2 are equal to each other. When the machine body speed is more than or equal to a predetermined machine body speed and when the position deviation between the machine body position W1 and the planned traveling route L is more than or equal to the first threshold, the pumping setting unit 60 corrects and sets the cycle by multiplying T by the correction value $\alpha 7$ and corrects and sets the duty ratio by multiplying D by the predetermined correction value $\beta 7$. Based on the cycle and the duty ratio corrected and set by the pumping setting unit 60, the second control unit 40a2 controls the left braking device 25a and the right braking device 25b.

In the preferred embodiment described above, when the machine body speed is more than or equal to a predetermined machine body speed (for example, 5 km/h, 10 km/h, or the like) while the position deviation between the machine body position W1 and the planned traveling route L is more than or equal to the first threshold, the pumping setting unit 60 corrects and sets the cycle to be longer and corrects and sets the duty ratio to be lower than when the machine body speed is less than the predetermined machine body speed. However, the pumping setting unit 60 may correct and set the cycle to become longer in proportion to the machine body speed and may correct and set the duty ratio to become lower in inverse proportion to the machine body speed.

Next, a case in which the pumping setting unit 60 corrects and sets the cycle and the duty ratio based on the state of the transmission 5 will be described. When the transmission 5 is switched to the increased speed drive, the pumping setting unit 60 sets the cycle to be shorter and/or sets the duty ratio to be higher than when the transmission 5 is switched to the equal speed drive. Consequently, when the front wheel 7F is driven faster than the rear wheel 7R, the working machine 1 can turn more quickly by causing the rear wheel 7R to generate a rotational difference.

In the present preferred embodiment, when the transmission 5 is switched to the increased speed drive while the position deviation between the machine body position W1 and the planned traveling route L is more than or equal to the first threshold, the pumping setting unit 60 corrects and sets the cycle to be shorter and corrects and sets the duty ratio to be higher than when the transmission 5 is switched to the equal speed drive. Specifically, when the transmission 5 is switched to the increased speed drive, the pumping setting unit 60 corrects the cycle to be shorter by multiplying the cycle T set based on the table by a predetermined correction value $\alpha 8$ (for example, about 60% to about 80%). When the transmission 5 is switched to the increased speed drive, the pumping setting unit 60 corrects the duty ratio to be higher by multiplying the duty ratio D set based on the table by a predetermined correction value $\beta 8$ (for example, about 110% to about 150%).

As illustrated in FIG. 6G, when the transmission 5 is switched to the equal speed drive and when the position deviation between the machine body position W1 and the planned traveling route L is less than the first threshold previously set, the pumping setting unit 60 does not set the cycle and the duty ratio, and the second control unit 40a2 controls the left braking device 25a and the right braking device 25b such that the propulsive force of the first wheel 7R1 and the propulsive force of the second wheel 7R2 are equal to each other. When the transmission 5 is switched to the equal speed drive and when the position deviation between the machine body position W1 and the planned traveling route L is more than or equal to the first threshold, the pumping setting unit 60 sets the cycle to T and sets the duty ratio to D. Based on the cycle and the duty ratio set by the pumping setting unit 60, the second control unit 40a2 controls the left braking device 25a and the right braking device 25b.

As illustrated in FIG. 6G, when the transmission 5 is switched to the increased speed drive and when the position deviation between the machine body position W1 and the planned traveling route L is less than the first threshold previously set, the pumping setting unit 60 does not set the cycle and the duty ratio, and the second control unit 40a2 controls the left braking device 25a and the right braking device 25b such that the propulsive force of the first wheel 7R1 and the propulsive force of the second wheel 7R2 are equal to each other. When the transmission 5 is switched to the increased speed drive and when the position deviation between the machine body position W1 and the planned traveling route L is more than or equal to the first threshold, the pumping setting unit 60 corrects and sets the cycle by multiplying T by the correction value $\alpha 8$ and corrects and sets the duty ratio by multiplying D by the predetermined correction value $\beta 8$. Based on the cycle and the duty ratio corrected and set by the pumping setting unit 60, the second control unit 40a2 controls the left braking device 25a and the right braking device 25b.

As long as the pumping setting unit 60 sets the cycle to be shorter and sets the duty ratio to be higher when the transmission 5 is switched to the increased speed drive than when the transmission 5 is switched to the equal speed drive, the method thereof is not limited to the aforementioned method. The pumping setting unit 60 may set the cycle to T and set the duty ratio to D based on the table when the transmission 5 is switched to the increased speed drive and may correct and set the cycle T and/or the duty ratio D when the transmission 5 is switched to the equal speed drive.

Next, a case in which the pumping setting unit 60 corrects and sets the cycle and the duty ratio based on the type of the first wheel 7R1 and the second wheel 7R2 will be described. When the first wheel 7R1 and the second wheel 7R2 are of a tire type, the pumping setting unit 60 sets the cycle to be shorter and/or sets the duty ratio to be higher than when the first wheel 7R1 and the second wheel 7R2 are of a crawler type. Consequently, the frequency of braking by the braking device 25 is set to be increased when the first wheel 7R1 and the second wheel 7R2 are of the tire type, which has a ground contact area less than that of the crawler type, and it is possible to regulate the steerability and the turnability of the tire type and the crawler type.

In the present preferred embodiment, when the first wheel 7R1 and the second wheel 7R2 are of the tire type while the position deviation between the machine body position W1 and the planned traveling route L is more than or equal to the first threshold, the pumping setting unit 60 corrects and sets the cycle to be shorter and corrects and sets the duty ratio to be higher than when the first wheel 7R1 and the second wheel 7R2 are of the crawler type. Specifically, when the first wheel 7R1 and the second wheel 7R2 are of the tire type, the pumping setting unit 60 corrects the cycle to be shorter by multiplying the cycle T set based on the table by a predetermined correction value α9 (for example, about 60% to about 80%). When the first wheel 7R1 and the second wheel 7R2 are of the tire type, the pumping setting unit 60 corrects the duty ratio to be higher by multiplying the duty ratio D set based on the table by a predetermined correction value β9 (for example, about 110% to about 150%).

Figure 6H:
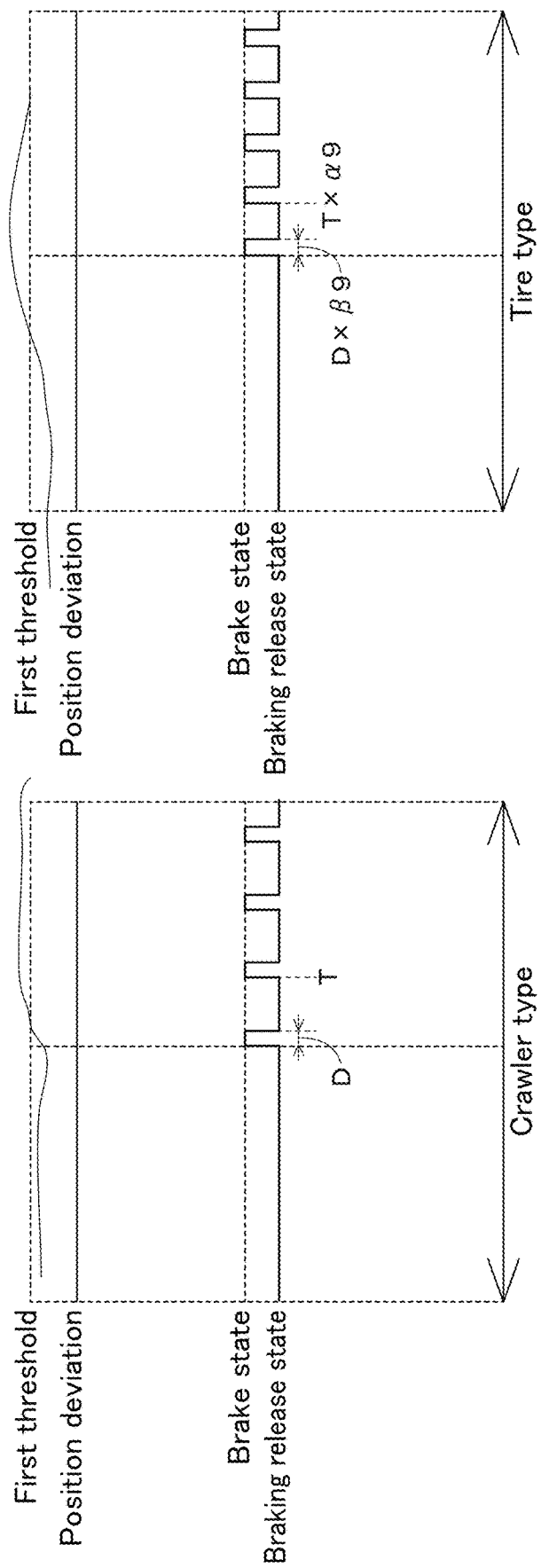
FIG. 6H is a tenth diagram describing setting of the cycle and the duty ratio by the pumping setting unit.
Figure 61:
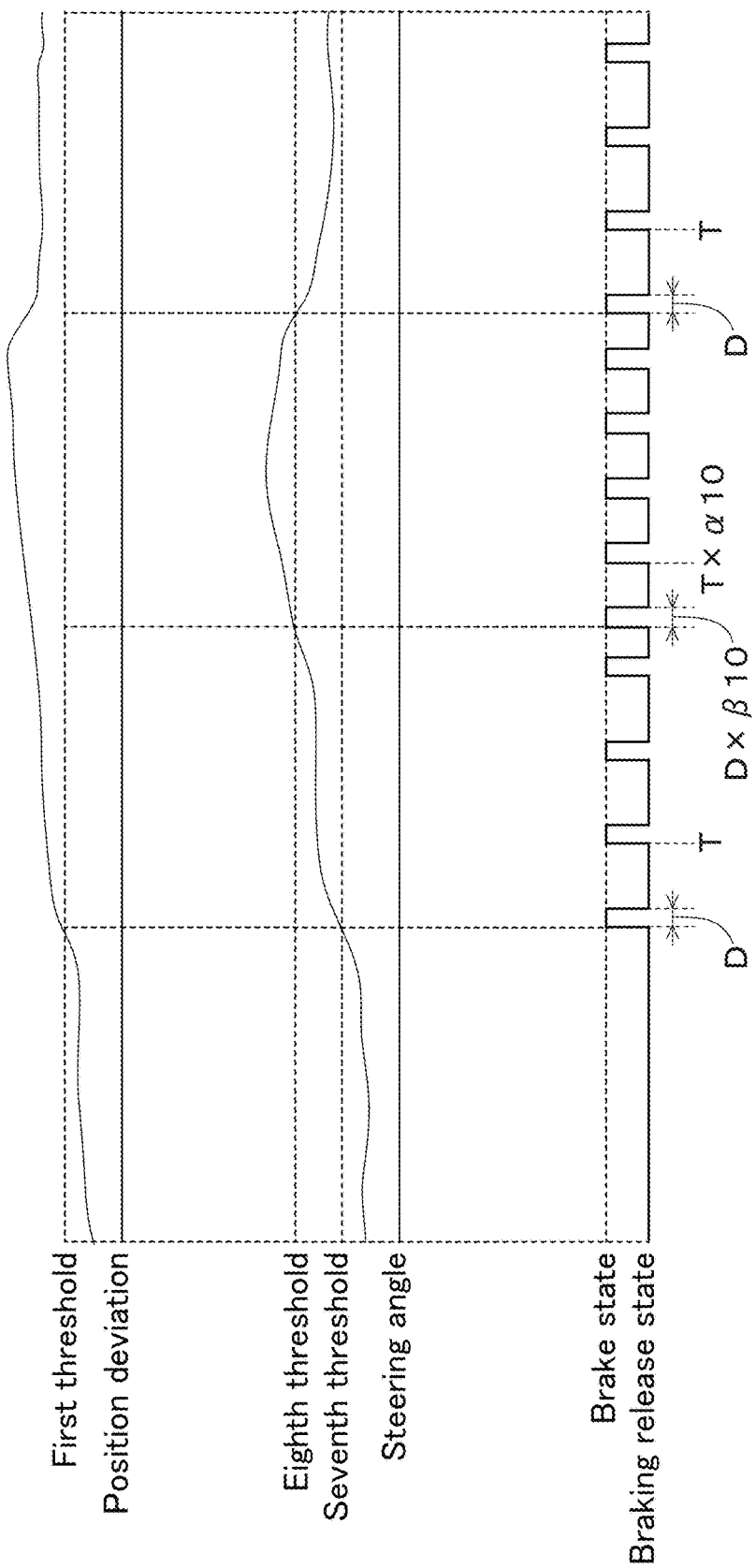

As illustrated in FIG. 6H, when the first wheel 7R1 and the second wheel 7R2 are of the crawler type and when the position deviation between the machine body position W1 and the planned traveling route L is less than the first threshold previously set, the pumping setting unit 60 does not set the cycle and the duty ratio, and the second control unit 40a2 controls the left braking device 25a and the right braking device 25b such that the propulsive force of the first wheel 7R1 and the propulsive force of the second wheel 7R2 are equal to each other. When the first wheel 7R1 and the second wheel 7R2 are of the crawler type and when the position deviation between the machine body position W1 and the planned traveling route L is more than or equal to the first threshold, the pumping setting unit 60 sets the cycle to T and sets the duty ratio to D. Based on the cycle and the duty ratio set by the pumping setting unit 60, the second control unit 40a2 controls the left braking device 25a and the right braking device 25b.

As illustrated in FIG. 6H, when the first wheel 7R1 and the second wheel 7R2 are of the tire type and when the position deviation between the machine body position W1 and the planned traveling route L is less than the first threshold previously set, the pumping setting unit 60 does not set the cycle and the duty ratio, and the second control unit 40a2 controls the left braking device 25a and the right braking device 25b such that the propulsive force of the first wheel 7R1 and the propulsive force of the second wheel 7R2 are equal to each other. When the first wheel 7R1 and the second wheel 7R2 are of the tire type and when the position deviation between the machine body position W1 and the planned traveling route L is more than or equal to the first threshold, the pumping setting unit 60 corrects and sets the cycle by multiplying T by the correction value α9 and corrects and sets the duty ratio by multiplying D by the predetermined correction value β9. Based on the cycle and the duty ratio corrected and set by the pumping setting unit 60, the second control unit 40a2 controls the left braking device 25a and the right braking device 25b.

As long as the pumping setting unit 60 sets the cycle to be shorter and sets the duty ratio to be higher when the first wheel 7R1 and the second wheel 7R2 are of the tire type than when the first wheel 7R1 and the second wheel 7R2 are of the crawler type, the method thereof is not limited to the aforementioned method. The pumping setting unit 60 may set the cycle to T and set the duty ratio to D based on the table when the first wheel 7R1 and the second wheel 7R2 are of the tire type and may correct and set the cycle T and/or the duty ratio D when the first wheel 7R1 and the second wheel 7R2 are of the crawler type.

Next, a case in which the pumping setting unit 60 corrects and sets the cycle and the duty ratio based on the steering angle of the steering device 11 will be described. In such a case, the second control unit 40a2 controls the braking device 25 based on the steering angle of the steering device 11 such that the machine body 3 travels along the planned traveling route L under a situation in which the working machine 1 performs automated traveling.

With a case in which the steering angle of the steering device 11 is zero being considered as a neutral position (straight traveling position), when the absolute value of the steering angle is less than a seventh threshold previously set, the second control unit 40a2 controls the braking device 25 and regulates the propulsive forces such that the rotational difference between the first wheel 7R1 and the second wheel 7R2 is zero and the machine body 3 travels straight. When the absolute value of the steering angle is more than or equal to the seventh threshold, the second control unit 40a2 causes a rotational difference between the first wheel 7R1 and the second wheel 7R2 in accordance with the steering angle and changes and turns the machine body course F1.

When the absolute value of the steering angle acquired by the steering-angle acquisition unit 40e is more than or equal to the seventh threshold, the second control unit 40a2 performs the pumping control to brake the wheel 7R, which is either one of the first wheel 7R1 and the second wheel 7R2, and which corresponds to the steering angle acquired by the steering-angle acquisition unit 40e.

Specifically, when the deviation (position deviation) between the machine body position W1 and the planned traveling route L is less than the first threshold previously set, when the first control unit 40a1 maintains the rotation angle of the rotary shaft 11b, and when the absolute value of the steering angle is less than the seventh threshold previously set, the second control unit 40a2 controls the braking device 25 and regulates the propulsive forces such that the rotational difference between the first wheel 7R1 and the second wheel 7R2 is zero and the machine body 3 travels straight.

When the position deviation between the machine body position W1 and the planned traveling route L is more than or equal to the first threshold, when the working machine 1 is positioned on the left side of the planned traveling route L, when the first control unit 40a1 rotates the rotary shaft 11b such that the steering direction of the working machine 1 is the right direction, and when the absolute value of the steering angle is more than or equal to the seventh threshold, the second control unit 40a2 controls the braking device 25 to reduce the rotation speed of the second wheel 7R2 to a value lower than the rotation speed of the first wheel 7R1 and change and turn the machine body course F1 to be in the right direction.

When the position deviation between the machine body position W1 and the planned traveling route L is more than or equal to the first threshold, when the working machine 1 is positioned on the right side of the planned traveling route L, when the first control unit 40a1 rotates the rotary shaft 11b such that the steering direction of the working machine 1 is the left direction, and when the absolute value of the steering angle is more than or equal to the seventh threshold, the second control unit 40a2 controls the braking device 25 to reduce the rotation speed of the first wheel 7R1 to a value lower than the rotation speed of the second wheel 7R2 and change and turn the machine body course F1 to be in the left direction.

When the absolute value of the steering angle acquired by the steering-angle acquisition unit 40e is more than or equal to an eighth threshold larger than the seventh threshold, the pumping setting unit 60 sets the cycle to be shorter and/or sets the duty ratio to be higher than when the absolute value of the steering angle is more than or equal to the seventh threshold and less than the eighth threshold. Consequently, the working machine 1 can further reduce the turning radius since the frequency of braking by the braking device 25 is set to be increased when the steering angle is increased.

Specifically, when the position deviation between the machine body position W1 and the planned traveling route L is more than or equal to the first threshold, when the first control unit 40a1 rotates the rotary shaft 11b of the working machine 1, and when the absolute value of the steering angle is more than or equal to the seventh threshold and less than the eighth threshold, the pumping setting unit 60 sets the cycle to T and sets the duty ratio to D.

When the position deviation between the machine body position W1 and the planned traveling route L is more than or equal to the first threshold, when the first control unit 40a1 rotates the rotary shaft 11b of the working machine 1, and when the absolute value of the steering angle is more than or equal to the eighth threshold, the pumping setting unit 60 corrects and sets the cycle to be shorter and corrects and sets the duty ratio to be higher than when the absolute value of the steering angle is more than or equal to the seventh threshold and less than the eighth threshold. In detail, when the absolute value of the steering angle is more than or equal to the eighth threshold, the pumping setting unit 60 corrects the cycle to be shorter by multiplying the cycle T set based on the table by a predetermined correction value $\alpha 10$ (for example, about 60% to about 80%). When the absolute value of the steering angle is more than or equal to the eighth threshold, the pumping setting unit 60 corrects the duty ratio to be higher by multiplying the duty ratio D set based on the table by a predetermined correction value $\beta 10$ (for example, about 110% to about 150%).

As illustrated in FIG. 6I, when the position deviation between the machine body position W1 and the planned traveling route L is less than the first threshold previously set, when the first control unit 40a1 maintains the rotation angle of the rotary shaft 11b, and when the absolute value of the steering angle is less than the seventh threshold, the pumping setting unit 60 does not set the cycle and the duty ratio, and the second control unit 40a2 controls the left braking device 25a and the right braking device 25b such that the propulsive force of the first wheel 7R1 and the propulsive force of the second wheel 7R2 are equal to each other.

As illustrated in FIG. 6I, when the position deviation between the machine body position W1 and the planned traveling route L is more than or equal to the first threshold previously set, when the first control unit 40a1 rotates the rotary shaft 11b, and when the absolute value of the steering angle is more than or equal to the seventh threshold and less than the eighth threshold, the pumping setting unit 60 sets the cycle to T and sets the duty ratio to D. Based on the cycle and the duty ratio set by the pumping setting unit 60, the second control unit 40a2 controls the left braking device 25a and the right braking device 25b.

As illustrated in FIG. 6I, when the position deviation between the machine body position W1 and the planned traveling route L is more than or equal to the first threshold previously set, when the first control unit 40a1 rotates the rotary shaft 11b, and when the absolute value of the steering angle is more than or equal to the eighth threshold, the pumping setting unit 60 corrects and sets the cycle by multiplying T by the correction value $\alpha 10$ and corrects and sets the duty ratio by multiplying D by the predetermined correction value $\beta 10$. Based on the cycle and the duty ratio corrected and set by the pumping setting unit 60, the second control unit 40a2 controls the left braking device 25a and the right braking device 25b.

In the preferred embodiment described above, when the absolute value of the steering angle is more than or equal to the eighth threshold, the pumping setting unit 60 corrects and sets the cycle to be shorter and corrects and sets the duty ratio to be higher than when the absolute value of the steering angle is more than or equal to the seventh threshold and less than the eighth threshold. However, the pumping setting unit 60 may correct and set the cycle to become shorter in inverse proportion to the magnitude of the steering angle and may correct and set the duty ratio to become higher in proportion to the magnitude of the steering angle. The seventh threshold and the eighth threshold described above may be larger values or smaller values than a predetermined value, and the relation of the magnitudes of the values is not limited.

The working machine 1 described above includes the machine body 3, the steering device 11 capable of changing an orientation of the machine body 3, the first wheel 7R1 provided on the machine body 3, the second wheel 7R2 provided on the machine body 3 and separated from the first wheel 7R1 in the machine-body width direction, the rotational difference generator 25 to cause a rotational difference between the first wheel 7R1 and the second wheel 7R2, and the controller 40 configured or programmed to include the first control unit 40a1 to set the steering angle of the steering device 11 based on the planned traveling route L, and the second control unit 40a2 to control the rotational difference generating device 25 based on the planned traveling route L to cause a rotational difference between the first wheel 7R1 and the second wheel 7R2. According to the aforementioned configuration, the working machine 1 can steer the machine body 3 more reliably by, in addition to steering of the steering device 11, the rotational difference between the first wheel 7R1 and the second wheel 7R2, and can turn quickly. In particular, when the first wheel 7R1 and the second wheel 7R2 are of the crawler type, it is possible to steer the machine body 3 more quickly since the ground contact areas of the first wheel 7R1 and the second wheel 7R2 are relatively large.

The rotational difference generator 25 includes the braking device 25 to cause a rotational difference between the first wheel 7R1 and the second wheel 7R2 by switching between the brake state in which braking of either the first wheel 7R1 or the second wheel 7R2 is performed and the release state in which the braking is not performed. Based on the planned traveling route L, the second control unit 40a2 is configured or programmed to cause the braking device 25 to perform setting about braking of either the first wheel 7R1 or the second wheel 7R2 by performing the pumping control in which switching between the brake state and the release state is repeated. According to the aforementioned configuration, it is possible to cause a rotational difference between the first wheel 7R1 and the second wheel 7R2 by a relatively simple configuration. It is also possible to suppress locking of the first wheel 7R1 and the second wheel 7R2.

The planned traveling route L includes the straight travel section L1 in which the machine body 3 travels straight and the turn section L2 in which the machine body 3 turns. The second control unit 40a2 is configured or programmed to perform the pumping control when the machine body 3 is positioned in the turn section L2. According to the aforementioned configuration, when the machine body 3 is to be turned, the turn can be more reliably performed since the machine body course F1 can be changed by, in addition to the steering device 11, the pumping control of the braking device 25.

The second control unit 40a2 is configured or programmed to set either the cycle at which the brake state and the release state are switched in the pumping control or the duty ratio at which the brake state is performed in the cycle. According to the configuration, steering and turning by the rotational difference between the first wheel 7R1 and the second wheel 7R2 can be regulated by the cycle and the duty ratio that are set by the second control unit 40a2.

The working machine 1 includes the front wheel 7F at a front portion of the machine body 3 and the steering angle of which is changeable by the steering device 11, and the transmission 5 to perform gear shifting. Each of the first wheel 7R1 and the second wheel 7R2 is the rear wheel 7R at a rear portion of the machine body 3. The transmission 5 is switchable between the equal speed drive in which both the front wheel 7F and the rear wheel 7R are driven at an equal or approximately equal speed and the increased speed drive in which the front wheel 7F is driven faster than the rear wheel 7R. The second control unit 40a2 is configured or programmed to set the duty ratio to be different between the equal speed drive and the increased speed drive. According to the aforementioned configuration, it is possible to improve convenience by regulating the rotational difference of the rear wheel 7R in accordance with the drive of the transmission 5.

The second control unit 40a2 is configured or programmed to set the duty ratio for the increased speed drive to be higher than the duty ratio for the equal speed drive. According to the aforementioned configuration, the working machine 1 can more quickly turn by causing the rear wheel 7R to generate a rotational difference when the front wheel 7F is driven faster than the rear wheel 7R.

For the equal speed drive, the second control unit 40a2 is configured or programmed to set the duty ratio in accordance with the speed of the machine body 3. According to the aforementioned configuration, it is possible to achieve both maintaining of the state of the agricultural field H and quick steering.

For the equal speed drive, the second control unit 40a2 is configured or programmed to set the duty ratio when the steering angle caused by the steering device 11 is more than or equal to a predetermined steering angle. According to the aforementioned configuration, it is possible to turn the machine body 3 more effectively by causing the rear wheel 7R to generate a rotational difference when the steering angle is more than or equal to a certain steering angle and when the machine body 3 is in a state of being turnable.

The working machine 1 includes the front wheel 7F disposed at a front portion of the machine body 3 and the steering angle of which is changeable by the steering device 11, and the transmission 5 to perform gear shifting. Each of the first wheel 7R1 and the second wheel 7R2 is the rear wheel 7R disposed at a rear portion of the machine body 3. The transmission 5 is switchable between the equal speed drive in which both the front wheel 7F and the rear wheel 7R are driven at an equal speed and the increased speed drive in which the front wheel 7F is driven faster than the rear wheel 7R. The second control unit 40a2 sets the cycle to be different between the equal speed drive and the increased speed drive. According to the aforementioned configuration, it is possible to improve convenience by regulating the rotational difference of the rear wheel 7R in accordance with the drive of the transmission 5.

The second control unit 40a2 is configured or programmed to set the cycle for the increased speed drive to be shorter than the cycle for the equal speed drive. According to the aforementioned configuration, the working machine 1 can more quickly turn by causing the rear wheel 7R to generate a rotational difference when the front wheel 7F is driven faster than the rear wheel 7R.

The first wheel 7R1 and the second wheel 7R2 are of the tire type or the crawler type. The second control unit 40a2 is configured or programmed to set the duty ratio to be different between the tire type and the crawler type. According to the aforementioned configuration, it is possible to improve convenience by regulating the rotational difference of the rear wheel 7R in accordance with the type of the first wheel 7R1 and the second wheel 7R2, in other words, traction of the first wheel 7R1 and the second wheel 7R2.

The second control unit 40a2 is configured or programmed to set the duty ratio for the tire type to be higher than the duty ratio for the crawler type. According to the aforementioned configuration, it is possible to regulate steerability and turnability of the tire type and the crawler type by setting the frequency of braking by the braking device 25 to be increased when the first wheel 7R1 and the second wheel 7R2 are of the tire type, which has a ground contact area smaller than that of the crawler type.

The first control unit 40a1 is configured or programmed to perform automated traveling in which the speed of the machine body 3 is changed based on the planned traveling route L. According to the aforementioned configuration, it is possible to realize automated traveling that exerts the effects described above.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working machine comprising:
   a machine body;
   a steering device capable of changing an orientation of the machine body;
   a first wheel provided on the machine body;
   a second wheel provided on the machine body and separated from the first wheel in a machine-body width direction;
   a rotational difference generator to cause a rotational difference between the first wheel and the second wheel; and
   a controller configured or programmed to include a first control unit to set a steering angle of the steering device based on a planned traveling route, and a second control unit to control the rotational difference generator based on the planned traveling route to cause a rotational difference between the first wheel and the second wheel; wherein
   the rotational difference generator includes a braking device to cause the rotational difference between the first wheel and the second wheel by switching between a brake state in which at least one of the first wheel and the second wheel is braked and a release state in which the at least one of the first wheel and the second wheel is not braked; and
   the second control unit is configured or programmed to:
   based on the planned traveling route, cause the braking device to perform setting about braking of either the first wheel or the second wheel by performing pumping control in which switching between the brake state and the release state is repeated; and repeatedly perform switching between the brake state and the release state in a predetermined cycle in the pumping control and maintain the brake state for only a predetermined time and the release state for only a predetermined time on one cycle of the predetermined cycle.

2. The working machine according to claim 1, wherein the planned traveling route includes a straight travel section in which the machine body travels straight and a turn section in which the machine body turns; and
the second control unit is configured or programmed to perform the pumping control when the machine body is positioned in the turn section.

3. The working machine according to claim 1, wherein the second control unit is configured or programmed to set either the cycle at which the brake state and the release state are switched in the pumping control or a duty ratio which indicates a percentage of time for maintaining the brake state performed in the cycle.

4. The working machine according to claim 3, further comprising:
a front wheel located at a front portion of the machine body and a steering angle of which is changeable by the steering device; and
a transmission to perform speed-shifting; wherein
the first wheel and the second wheel are each a rear wheel at a rear portion of the machine body;
the transmission is switchable between an equal speed drive in which power is transmitted to both the front wheel and the rear wheel causing both the front wheel and the rear wheel to be driven at an equal or approximately equal speed and an increased speed drive in which power is transmitted to both the front wheel and the rear wheel causing the front wheel to be driven faster than the rear wheel; and
the second control unit is configured or programmed to set the duty ratio to be different between the equal speed drive and the increased speed drive.

5. The working machine according to claim 4, wherein the second control unit is configured or programmed to set the duty ratio for the increased speed drive to be higher than the duty ratio for the equal speed drive.

6. The working machine according to claim 5, wherein, for the equal speed drive, the second control unit is configured or programmed to set the duty ratio in accordance with a speed of the machine body.

7. The working machine according to claim 6, wherein, for the equal speed drive, the second control unit is configured or programmed to set the duty ratio when the steering angle caused by the steering device is more than or equal to a predetermined steering angle.

8. The working machine according to claim 3, further comprising:
a front wheel at a front portion of the machine body and a steering angle of which is changeable by the steering device; and
a transmission to perform speed-shifting; wherein
the first wheel and the second wheel are each a rear wheel at a rear portion of the machine body;
the transmission is switchable between an equal speed drive in which power is transmitted to both the front wheel and the rear wheel causing both the front wheel and the rear wheel to be driven at an equal or approximately equal speed and an increased speed drive in which power is transmitted to both the front wheel and the rear wheel causing the front wheel to be driven faster than the rear wheel; and
the second control unit is configured or programmed to set the cycle to be different between the equal speed drive and the increased speed drive.

9. The working machine according to claim 8, wherein the second control unit is confused or programmed to set the cycle for the increased speed drive to be shorter than the cycle for the equal speed drive.

10. The working machine according to claim 3, wherein
the first wheel and the second wheel are of a tire type or a crawler type; and
the second control unit is configured or programmed to set the duty ratio to be different between the tire type and the crawler type.

11. The working machine according to claim 10, wherein the second control unit is configured or programmed to set the duty ratio for the tire type to be higher than the duty ratio for the crawler type.

12. The working machine according to claim 1, wherein the first control unit is configured or programmed to perform automated traveling in which a speed of the machine body is changed based on the planned traveling route.

* * * * *